United States Patent
Schmidt

(10) Patent No.: US 11,974,579 B2
(45) Date of Patent: May 7, 2024

(54) SELF-ADJUSTING, ROTATABLE STABILIZED SEMI-VISCOUS MATERIAL ROUNDER BAR SEAL WITH AUTOMATIC HEIGHT ADJUSTMENT

(71) Applicant: Norman Schmidt, Burnaby (CA)

(72) Inventor: Norman Schmidt, Burnaby (CA)

(73) Assignee: Food Machinery Engineering, LMTD., Burnaby (CA)

( * ) Notice: Subject to any disclaimer, the term of this patent is extended or adjusted under 35 U.S.C. 154(b) by 157 days.

(21) Appl. No.: 17/188,624

(22) Filed: Mar. 1, 2021

(65) Prior Publication Data

US 2022/0007657 A1 Jan. 13, 2022

Related U.S. Application Data

(60) Provisional application No. 62/983,665, filed on Feb. 29, 2020.

(51) Int. Cl.
*A21C 7/02* (2006.01)

(52) U.S. Cl.
CPC ..................... *A21C 7/02* (2013.01)

(58) Field of Classification Search
CPC ........... A21C 7/02; A21C 7/0015; A21C 9/08; A21C 3/028; B29C 67/0003

(Continued)

(56) References Cited

U.S. PATENT DOCUMENTS

| 3,377,965 A | * | 4/1968 | Harold | ..................... A21C 7/01 425/364 R |
| 3,521,578 A | * | 7/1970 | Joseph, Sr. | .............. A21C 7/02 425/332 |

(Continued)

FOREIGN PATENT DOCUMENTS

| EP | 2298078 A2 | * | 3/2011 | ................ A21C 7/01 |
| ES | 2283181 A1 | * | 10/2007 | ................ A21C 7/01 |

*Primary Examiner* — Jeffrey M Wollschlager
*Assistant Examiner* — Edgaredmanuel Troche
(74) *Attorney, Agent, or Firm* — Tangent Law Group, PLLC; Eric J. Weierstall, Esq.

(57) ABSTRACT

The invention is directed to a rounder or rounding machine having one or more conveyor(s) having a horizontal conveyor surface with a support frame. One or more rounder bars are coupled to the support frame by one or more rounder bar height adjustment systems above the conveyor at a set height and at a camber angle set by one or more camber adjustment systems. A rounder bar seal on the rounder bar is provided having a rounder bar seal channel and a rounder bar seal channel contour. The rounder bar seal having a first body member having one or more semi-spherical contours and a second body member extending down at an angle from the first body member, and third body member extending from the first body member and extending in an opposed direction from the second body member. The rounder bar seal channel contour mates with, at least in part, the first body member through the one or more semi-spherical contours, the first body member being coupled and retained within the channel, rotating freely therein. The second and third body members extending and contacting the horizontal conveyor surface of the conveyor belt and self aligning the seal bar with the horizontal conveyor surface such that the rounder bar seal effectively forms a seal.

9 Claims, 15 Drawing Sheets

(58) Field of Classification Search
USPC ........ 425/184, 196, 332, 333; 198/493, 494, 198/497, 498, 499
See application file for complete search history.

(56) References Cited

U.S. PATENT DOCUMENTS

| | | | | |
|---|---|---|---|---|
| 4,306,850 A | * | 12/1981 | Cummins | ................ A21C 7/01 |
| | | | | 425/332 |
| 5,714,178 A | * | 2/1998 | Keener | .................... A21C 7/01 |
| | | | | 425/332 |
| 2002/0037336 A1 | * | 3/2002 | Oki | .......................... A21C 7/01 |
| | | | | 425/332 |

* cited by examiner

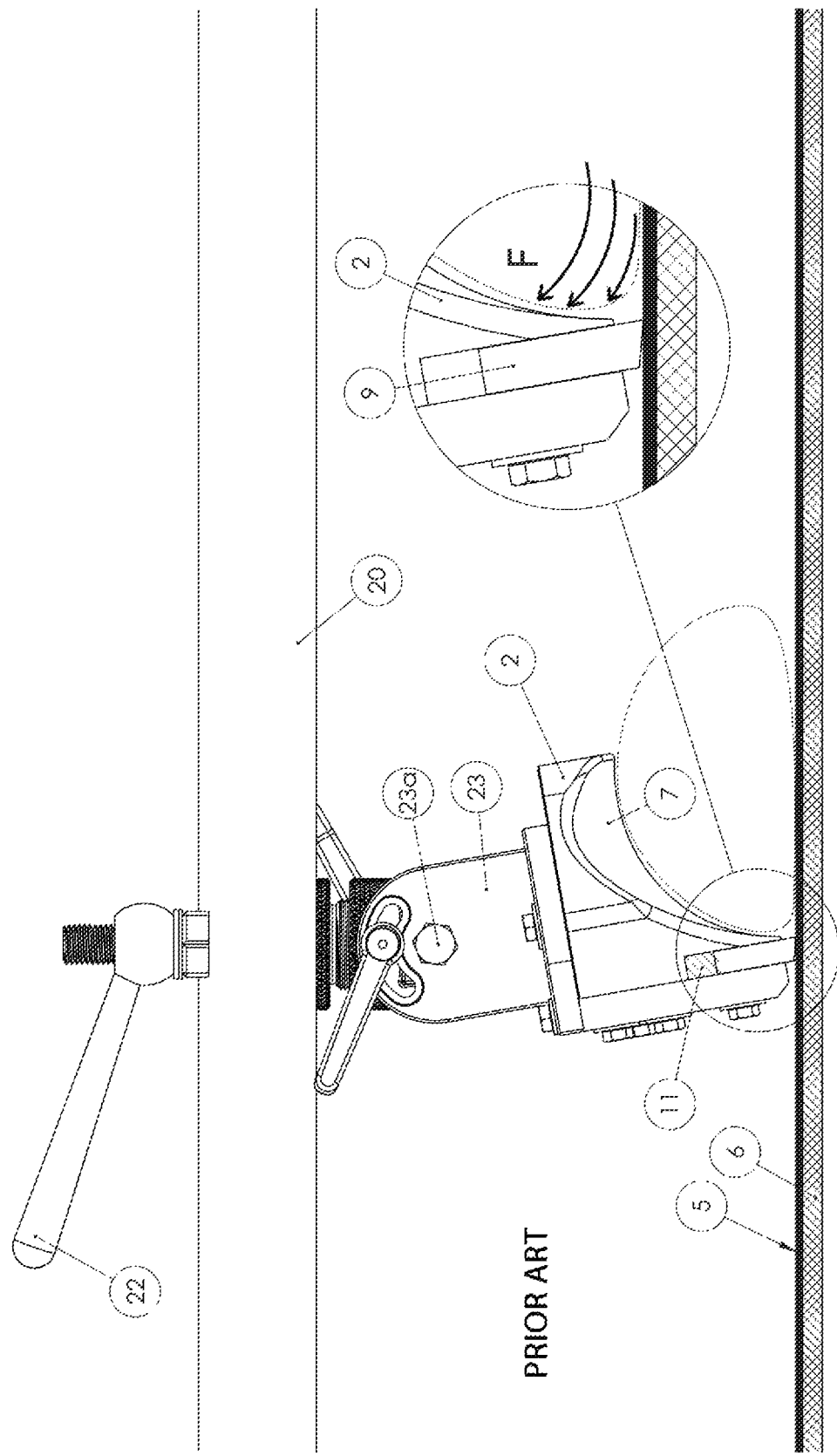
Figure: 10
PRIOR ART

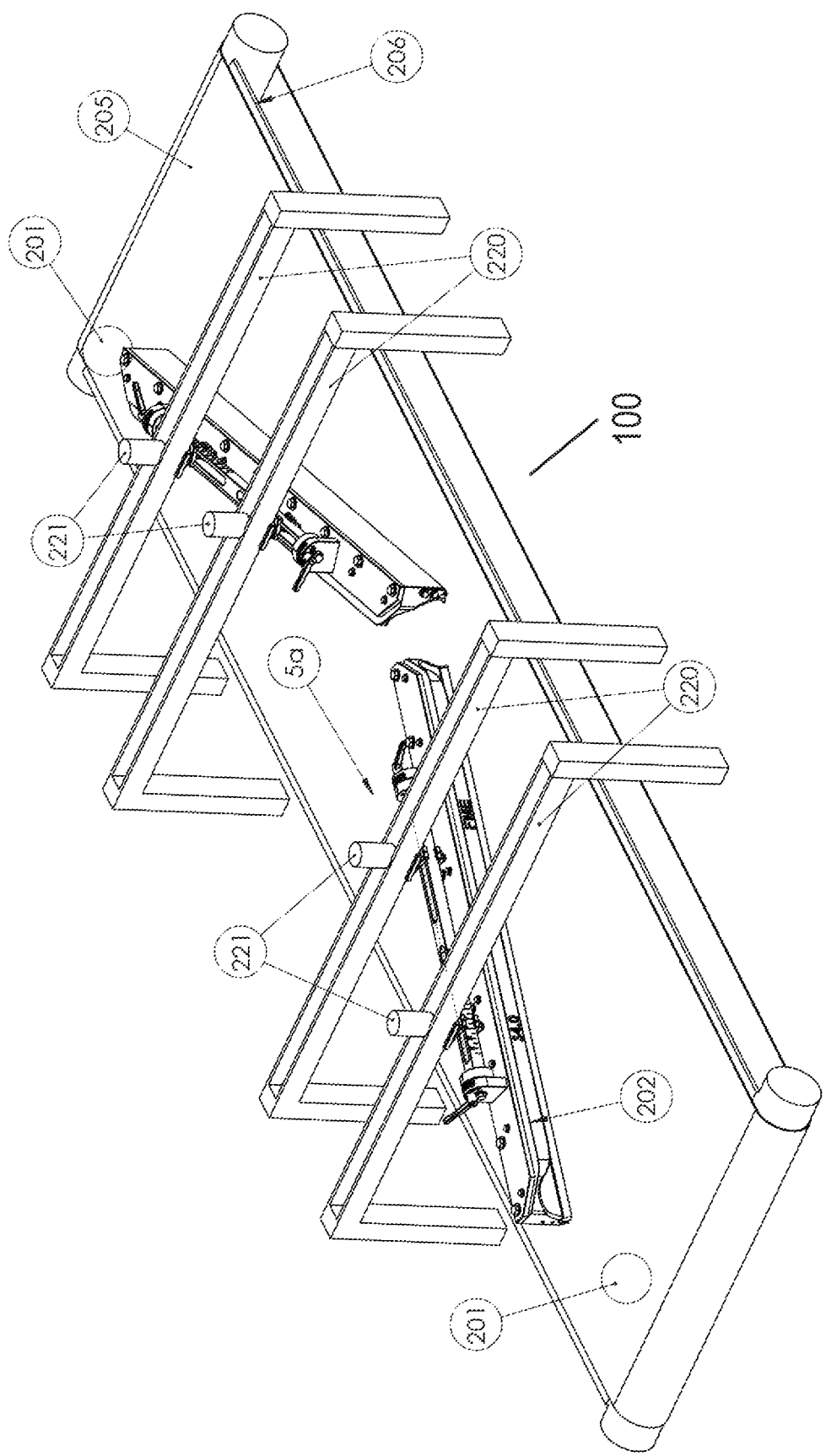
Figure: 11

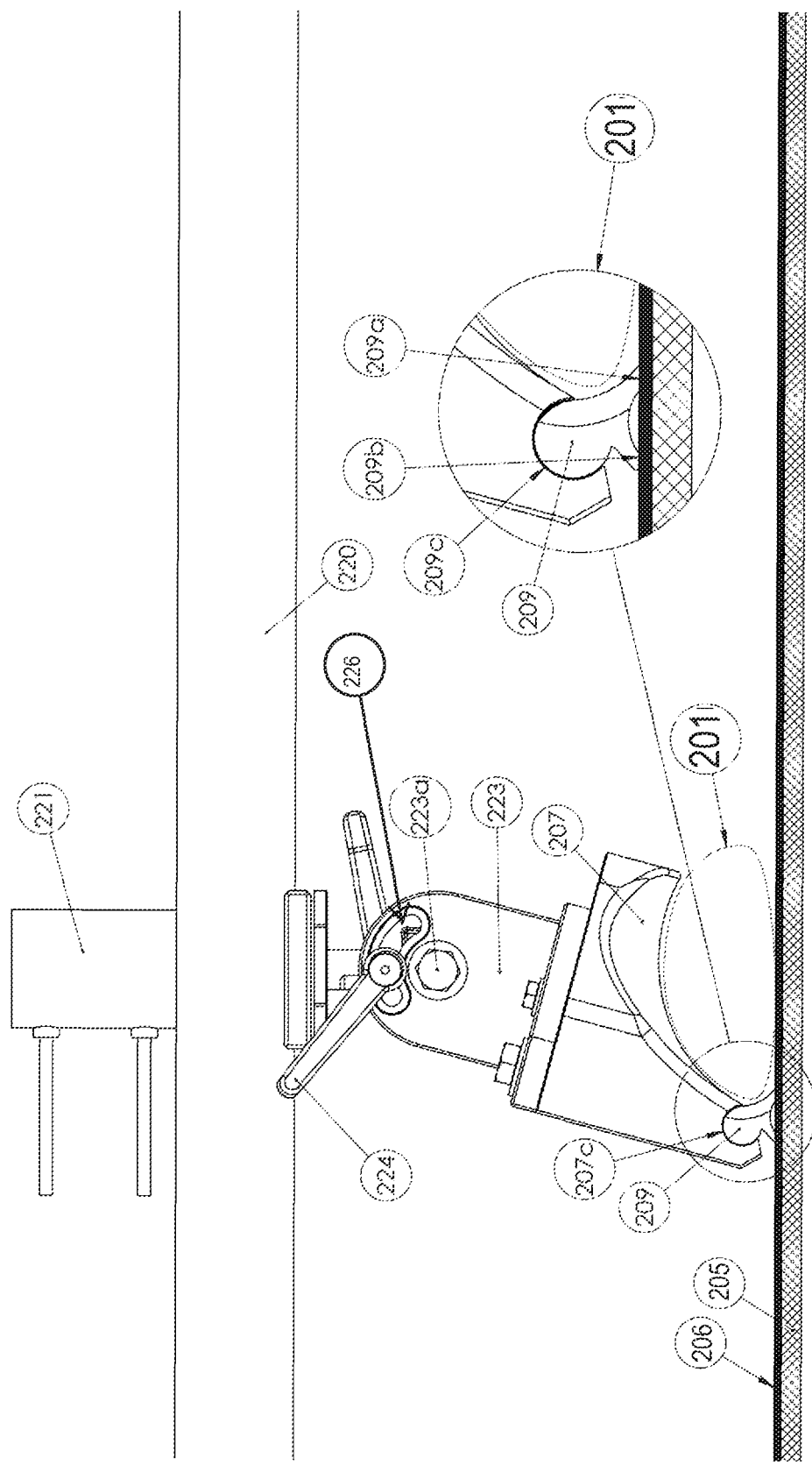
Figure: 12

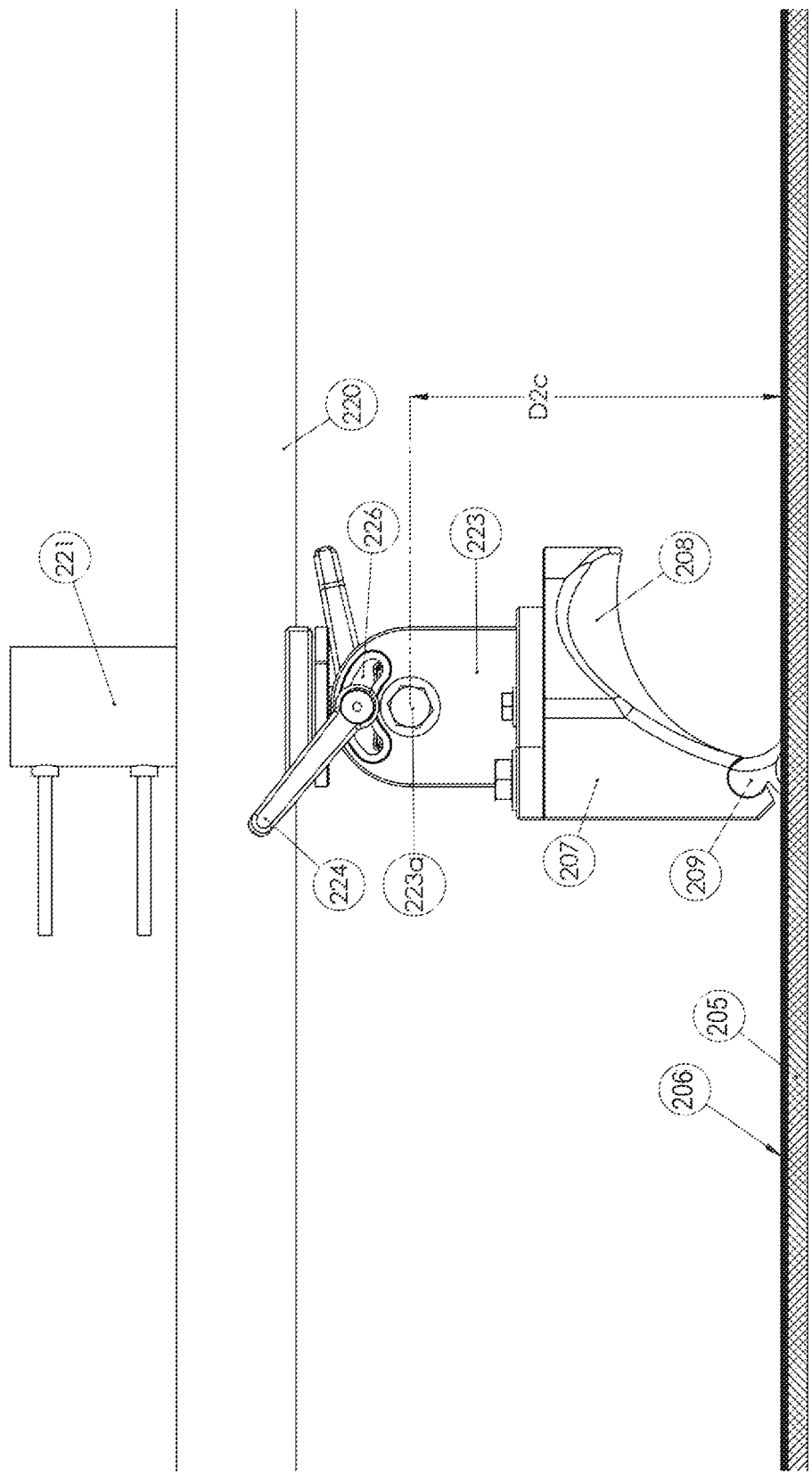

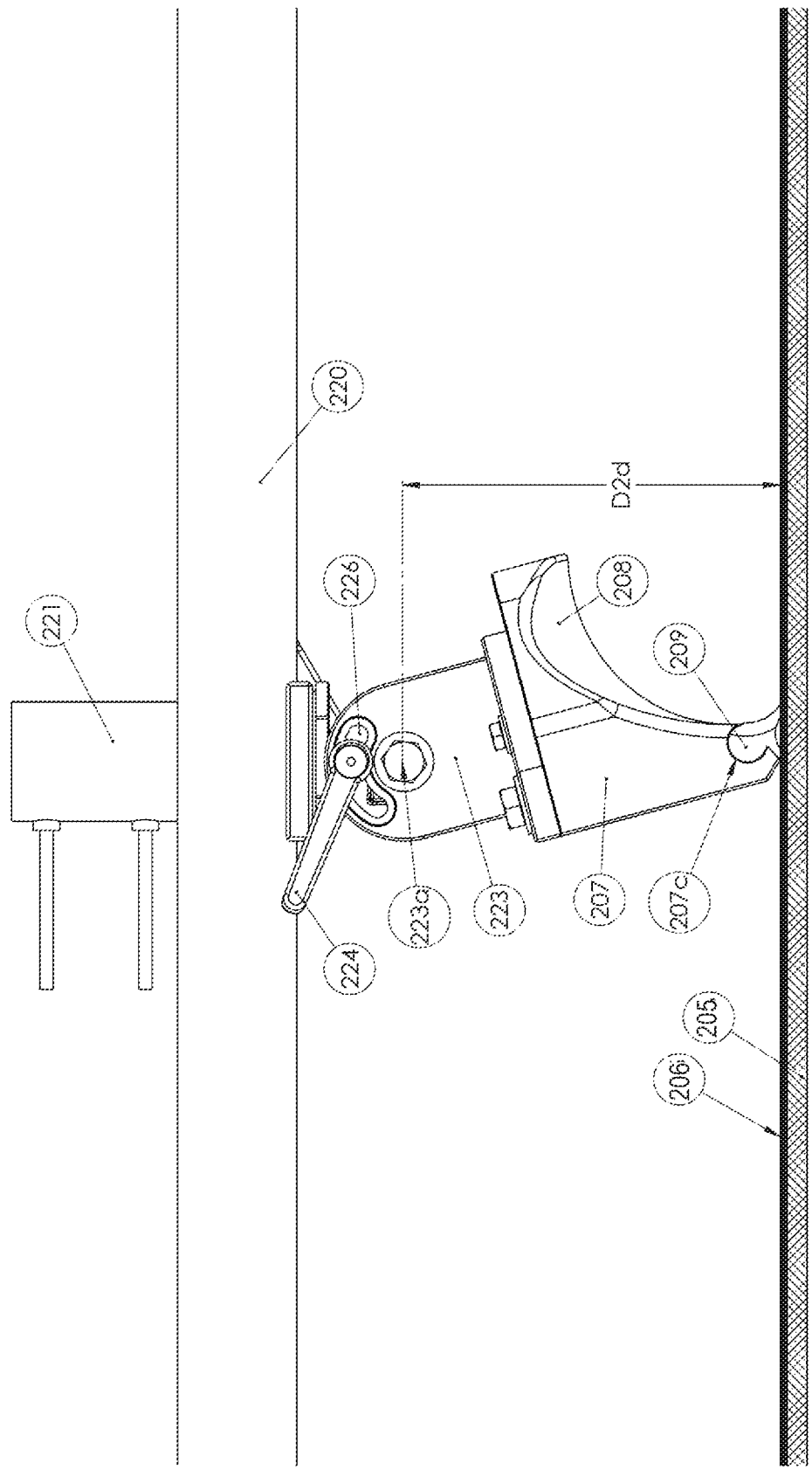
Figure:14

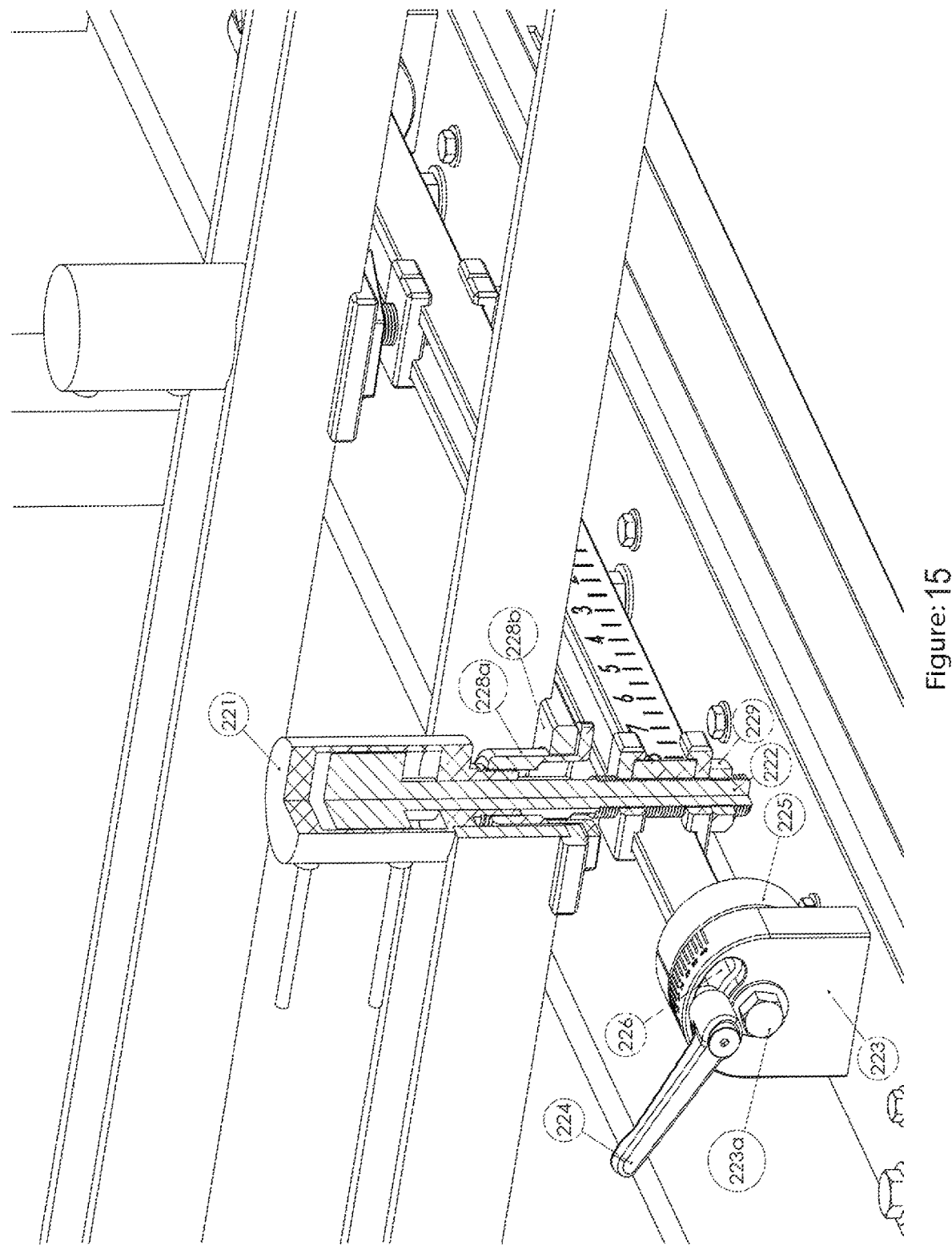
Figure:15

SELF-ADJUSTING, ROTATABLE STABILIZED SEMI-VISCOUS MATERIAL ROUNDER BAR SEAL WITH AUTOMATIC HEIGHT ADJUSTMENT

CROSS REFERENCE TO RELATED APPLICATIONS

This application claims the priority of U.S. provisional patent application 62/983,665 filed Feb. 29, 2020, which is incorporated herein by reference.

FIELD OF THE INVENTION

The instant invention is directed to an improved contoured rounder or rounding bar of the type typically used in equipment used to, but not limited to, round portions of dough or semi solid medium portions with a self-adjusting seal bar or rounder bar seal system that maintains angle and pressure during rounding processes. By utilizing a rounding bar with a self-adjusting seal bar system the contoured rounding bar is able to more effectively round portions of semi solid medium into a semicircular, round or spherical shape by maintaining contact with and retraining the dough or semi-solid medium portions.

BACKGROUND OF THE INVENTION

During operation of typical linear rounder a portion of semi viscous material such as but not limited to bread, roll, pizza or similar dough products is made substantially spherical or smoothed for baking. The portion of dough 1 is typically taken from bulk raw dough and removed as a rough portioned shape for instance, as a non-limiting example, starting as a brick or cylinder. This rough portion needs to be re-formed in most instances into, but is certainly not limited to, a final spherical shape. The process is called rounding and is typically accomplished by mechanical method and machine known as a rounder.

In the production of products made from semi-solid medium portions such as but not limited to dough for bread, pizza bases, rolls, tortilla rounds and the like, it is an important step in the production to shape the non-uniform, non-rounded portion into a spherical shape. It is significant that this production have a final product of consistent shape and outward appearance. As an example, when making pizza bases in commercial automated applications using a poorly rounded dough portion there is a high probability that the final product will be misshaped and its appearance may drop below acceptable characteristics in dimensions and workability, as a miss-shaped dough portion may not easily stretch out to a round pizza base and therefore needs manual labor intervention to correct the shape and size thereby adding costs and loss of production. There is also an issue with rounding blemishes that are prevalent on the dough portions created by some existing devices that can occur from the prior art devices conventional rounding such that when the dough portion is rounded it has a blemish on the surface of the rounded dough portion. One typical type of blemish will have the appearance of a "navel" on a Navel Orange, this blemish will create issues when the dough ball is stretched and worked to create the flat pizza base. When stretched this blemish will almost always leave a blemish in the surface of the pizza, in other cases it will cause or be the source of a tear in the pizza base. Other blemishes, such as creases, may also be formed by the contact.

An inline rounder typically provides a constantly contoured rounder bar which is placed on an angle relative to the path of travel along a wide flat bed conveyor that has a conveyor belt running on it. Essentially it is a horizontal process on a conveyor system and thus differs from conical and cylindrical systems in that the direction and nature of the forces are more easily controlled and they generate less waste. The semi solid material portion is dropped on the moving conveyor belt so that the moving conveyor belt presents the semi solid medium portion to the entry opening of the contoured rounder bar. The semi solid material portion then contacts the receiving opening end of the contoured rounder bar which starts the semi solid material portion into a rotation and the previously indicated rounding process occurs.

With typical, prior art rounding devices or machines there is, at some point, at least one contoured bar which will be affixed at an angle to a moving surface. Existing inline rounder devices typically provide long, straight constant contour rounder bars set diagonally across the conveyor that are used to round portions of roll dough, for instance dough balls typically used to make hot dog and hamburger buns where dough was portioned in a simultaneous four or six across fashion and the dough portions drop drops onto the conveyor belt and proceed into four or six parallel rounder bars that go diagonally across the belt as examples.

These rounders have several issues that lead to less efficient rounding. As an example of the continuing issues that produced less than desired rounding, one can look at a portion of pizza dough which is rounded using devices utilizing this process. In this rounding procedure the dough portion often gets a blemish. Often referred to as a triple point blemish it occurs where the interface with the rounder bar contour and the rounder bar seal bar and the moving conveyor belt occurs, there is typically a blemish generated that resembles the navel on a Navel Orange. A large portion of this blemish is due to combined contact point or triple point where the moving conveyor belt contacts the bottom of the rounder bar seal and the rounder bar seal meets to rounder bar contour and then moves to substantially vertical along the contour. This area has the potential to create a blemish where open folds of dough are spun in a circular spiral going into the end of the dough portion similar in appearance to the end of a Navel Orange. A number of elements can be improved to reduce the chance of this blemish arising.

In particular the fixed aspect or element of the fixed nature of the prior art can lead or contribute to the issues, particular at the interface between the rounder bar or seal and the conveyors. Often it is the case that in the prior art the rounder bar or rounder bar seal is manufactured at a certain angle so as to have a minor degree or angular difference between rounder bar seal surface and the interface of whichever bar is engaged with the conveyor belt surface. This angle is so that the downward force on the rounder bar or rounder bar seal in contact with the conveyor surface is spread out over a larger width of rounder bar seal surface so that the heat due to friction is also spread out over a larger surface thereby avoiding concentrated frictional heat generation where temperature will go too high for conveyor belt and/or rounder bar seal surface operational limits and damage will occur. In other words, if the contacting surface is very small then all of the heat generated is focused into this small area—easily causing overheat and failure in operation.

Problems also occur with the prior art when the camber is adjusted it can change the height or distance from the seal bar edge to the rounder bar support frame. When this occurs the rounder bar needs to be adjusted so as to extend or retract so that the seal of the rounder bar will be at the required height above the conveyor belt surface to avoid material leakage. This adjustment can have issues such as but not limited to time required to make adjustments during change over when required due to changes in dough portion size warrants. The other aspect is that if this height change is not properly carried out such as when the dough portion size goes from a small portion size to a large portion size then the rounder bar will be rotated to where the rounder bar contour is more open. When the rounder bar is rotated to be more open then the distance between the structure and the seal tip can increase and if an operator fails to make the necessary changes in height adjustment then the result could be that the contact force on the rounder bar seal surface tip to the conveyor belt will be too high and therefore possibly result in excessive force which translates to excessive friction such that the conveyor belt and/or the rounder bar seal tip can be damaged due to overheating. Not to mention that localized heating may also heat the dough and cause other types of failures and issues.

One prior art rounding machine that attempts to address some of the issue with the pressure at the interface is seen in U.S. Pat. No. 4,306,850, which discloses an inline rounder that has a biased flexible foot that helps to keep material from being lost between the rounding bar and the conveyor belt by maintaining continuous contact despite surface irregularities. A rounding bar with a consistent contour is shown. Attached to this is a single biased, blade element shown with and being biased by a spring means. Though this is an improvement over the solid elements used in other devices, it still has the issues noted with point loading, wear, and float or disconnect. The angle of the scraper component still leads to high surface loading pressures and does nothing to further stabilize the scraper or address forces exerted by the dough on the rounder bar seal. Nor does it discuss adjusting for changes in size, camber and position of the rounder bar automatically. Thus these existing inline rounder devices with single or multiple contour rounder bars generally have fixed, non-rotating seal elements which have the same drawbacks as the other prior art devices, namely static sealing elements requiring additional manual adjustment and loading forces and seal structures that can be detrimental to sealing and increase wear.

Existing rounder bars also tend to cause or create what is called a triple point blemish which often occurs when the rounder bar seal makes a substantially perpendicular angle or going from a substantially perpendicular angle and towards an acute angle relative to the conveyor belt whereby the dough is drawn into this area and thru the action of the moving conveyor belt becomes entrained and wedges into or between the seal bar to belt mating surface. This leakage between the belt and the seal is an undesirable effect and the principal way to reduce this effect is to apply a higher compressive force to the seal bar to reduce or try to remove this leakage effect, which then creates increased friction and associated issues as previously indicated.

To overcome this deficiency in the prior art, an aspect of the invention is to provide a consistent, self adjusted angle of contact that the scraper on the bar makes to the belt, an angle that much like action of scraping ice from the windshield of a car is idealized for forcing the material up and away from the conveyor belt surface. If the scraper is held at an acute angle with the contact point of the scraper extending behind the direction of travel of the tip, then the scraper glides over the window. If held perpendicular to the glass and to the direction of travel the edge has a point of contact with little graduation and the forces are blunted, moving much less effectively along the surface and moving with great difficulty. The acute angle forward by an inclined angle of attack, where the contacting edge is at the front of the direction of travel, makes scraping easier and more efficient. So in an exemplary embodiment, a scraper is needed that is biased in a way that goes out from the bar on an outward and forward direction. To do this with the necessary structural rigidity is difficult using a long-cantilevered section in plastic as it will tend to bend and deform in that bends direction or as coined in the plastics industry it will creep and plastically deform over time.

The exemplary embodiment of the instant invention would provide a profile that goes out in front of the back of the rounder bar contour in a generally well supported wedge shape so as to have a nice consistent contour of belt to scraper relative to the rounder bar contour whereby the contour does not create the typical triple point navel style blemish or pinch under movement found in prior art designs. With an exemplary embodiment providing a rotatable, supported scraper element which also balances the loading on the scraper. A rearward facing element carries a load similar to the forward facing wedge element. The balancing of the load is a good way to cancel the cantilevering load imparted by the extension of the forward facing aspect of the seal and avoid the aforementioned deformation over the course of use. With the scraper bar at an acute angle with a further contact point behind the acute angle portion relative to the direction of travel the seal bar would provide or allows the sealing element to glide over the conveyor belt while providing efficient scraping.

Therefore a need exists to provide rounding bars that provide for a positive self-adjusting, self-aligning sealing element to promote uniform rounding, maintain a set pressure against the conveyor belt, adjust its height automatically, maintain and advantageous scraping angle in all camber setting, and are easily tailored to specific dough or semi-solid material rounding types. Additionally, a further need exists for an improved, automatic height adjustment device or system that would provide for further enhancements in efficiency and consistency and reduce wear and friction when deploying the improved rounder bar seal. This new, contour rounding bar with self-adjusting sealing element, self-adjusting height and pressure system, and devices mounting same, and the improved rounding process using these devices will result in more consistent rounding with improved entrainment, contact, and duration of rounding throughout all axis of rotation so as to overcome the rounding deficiencies of the prior art rounder bar devices. The rounding bar with self-adjusting sealing system should also be easily removed and replaced as needed and/or cleaned so as to accommodate a wider variety of materials and setups.

A further need exists to provide for automatic adjustment system for the rounder bar and rounder bar sealing element whereby the system adjusts its height to accommodate different sized dough balls and camber settings. Damage can occur from improperly setting or resetting the rounder bar height manually. In existing seals, if the height is improperly set such that there is too great a force on the seal or the rounder bar is rotated at such an angle or in such a setting so as to be pulled by the belt or folded or pinched by the belt, there is a potential that the operation of the belt and the contoured rounder bar in this position could damage by overheating or destroy such a seal.

To alleviate some of this risk, a self-adjusting seal is needed that makes height adjustment and is self-righting/self-adjusting. This can be provided by changing both the system used to provide elastic compaction or suspension of the rounder bar so as to make the height adjustment automatic coupled with or in connection with a more robust sealing element. In an exemplary embodiment, for instance, the foot of the rounder bar could provides a female spheroid or semi-spherical receiver to permit rotation and a similar male profile on a sealing element such that the attached bar seal is a long-profiled section with a profile that permits rotation and that mates with the female contour into the foot of the rounder bar. This mating section would accommodate rotation of the rounder bar and the aforementioned contour of the scraper, having a forward facing portion and a trailing portion, maintains optimal contact angle to the moving conveyor belt automatically. An automatic height adjusting mount can then hold the rounder bar in position and automatically and properly space the bar to the conveyor belt and the scraper bar will automatically adjust to face the proper direction.

Finally a need exists for a resilient member as a part of a contoured rounding bar system which can reasonably adjust and withstand operating contact pressures. An exemplary solution would provide for an automatic height adjustment device to provide a consistent force relative to the belt during operation and a resilient seal member to maintain the sealing of the rounder bar and scraping of material from the conveyor belt. Whereas the previous polymer, spring or resilient foam systems having a chisel shape seal element had to be provided a manual adjustment to increase pressure to compact and maintain contact forces for scraping efficiency or loose efficiency when adjusting camber or from other variables, a need exists to provide a more robust seal system to maintain contact. The adjustment of the prior art often could not be done during operations, requiring time to stop and manually adjust the device.

As a resilient member, the body of the improved resilient member seal would allow for preloading to an initial pressure and would deflect or compress with this initial pressure to align but also allow for further compression during operation and during adjustments to higher loading pressures better than the existing prior art members due to its geometry. The resulting exemplary embodiment of a contoured rounding bar and sealing system would thus by design and material selection also produce a well structured, strong but compressible and extendable device which as additional pressure is applied or removed would deform to extend or compress to maintain a constant seal pressure exerted and orientation during operation and thereby maintain the force on the seal bar or element and maintain efficient contact with the conveyor belt.

SUMMARY OF THE INVENTION

An aspect of the invention is to provide an inline rounding device having an automatic height adjustment system and rotatable, self-leveling, self-aligning seal bar having at least two legs stabilizing the sealing bar and improving resulting rounding.

An aspect of the invention is a means of providing for the automatic height adjustment required when changing from smaller portions to larger portions or larger to smaller portions in a rounder machine.

A further aspect is to provide for automatic height adjustment in conjunction with rounder bar camber rotation which changes the height of rounder bar mounting which needs to be accommodated or compensated for when rounding bread, bun, pizza doughs and the like.

Yet another aspect of the invention is to provide a means of maintaining a constant pressure on the rounder bar seal regardless of extension required in the height of the rounder bar.

An aspect of the invention is an improved seal bar foot that peels the dough from the belt and rounds the dough at a point where the contour of seal to rounder bar is better or approaches a step-less contour which peals material off ahead of the remaining structure in contact with the conveyor belt for better scraping of material over less advantageous geometries that have in the prior art resulted in having less efficient removal of material from the conveyor belt.

Another aspect of the invention is to provide a self-adjusting, self-stabilizing, step-less transition contour and rotating rounder bar seal or seal bar the new or illustrated novel generation of rounding bar drastically reducing blemishes formed on the rounding bar as it has a more consistent seal that prevents pinching.

A further aspect of the invention includes a seal bar with a foot portion with at least two legs or sections that rotates so as to self adjust and create a more uniform contact with the conveyor belt and brings the point of where the dough is removed further ahead or away from the rounder bar to produce a more fully encompassing rounding of the dough portion.

Yet another aspect of the invention provides at least one height compensation adjustment device that provides automated retraction and extension compensation as well as adjustable seal bar pressure, which additionally provides the capability to assist in keeping the position of the compensation adjustment device and the rounder bar providing enhanced load bearing without significant deflection during operation.

The invention includes an apparatus, a method for operating the apparatus, and an article of manufacture.

The apparatus of the invention includes a rounder bar seal element having a first body member of at least three body members having at least a first semi-spherical contour and a second body of the at least three body members extending down at an angle from the first body member and a third body member of the at least three body members extending from the first body member and extending in an opposed direction from the second body member wherein the second and third body members of the at least three body members lay upon a vertical surface with the first body member extending upwardly from the horizontal.

The apparatus of the invention further includes a rounder bar with a rounder bar seal. The rounder bar including a rounder bar seal channel having a rounder bar seal channel contour. Further including a rounder bar seal coupled to the rounder bar via the rounder bar channel. The rounder bar seal with a first body member of at least three body members having at least a first semi-spherical contour. A second body of the at least three body members extending down at an angle from the first body member and a third body member of the at least three body members. With the third body member extending from the first body member and extending in an opposed direction from the second body member. Wherein the channel contour matches the first body member of the at least three body members at least first semi-spherical contour and with the first body portion of the at least three body portions being coupled within the channel and rotating freely therein, the second and third body members of the at least three body members extending from the first body member of the at least three body members and contacting a horizontal surface and self aligning the seal bar on the horizontal surface.

The apparatus of the invention including a rounder apparatus having an at least one conveyor with a conveyor surface and an at last one support frame. An at least one rounder bar height adjustment system is included along with an at least rounder bar camber adjustment system. An at least one rounder bar is provided which is coupled to the support frame by the at least one rounder bar height adjustment system above the conveyor at a set height and at a camber angle set by the at least one camber adjustment system. A rounder bar seal is set on the at least one rounder bar having a rounder bar seal channel and a rounder bar seal channel contour with a rounder bar seal. The rounder bar seal having a first body member of at least three body members having at least a first semi-spherical contour, a second body of the at least three body members extending down at an angle from the first body member and a third body member of the at least three body members extending from the first body member and extending in an opposed direction from the second body member. Wherein the rounder bar seal channel contour mates with at least in part the first body member of the at least three body members and with the first body portion of the at least three body portions being coupled and retained within the rounder bar seal channel and rotating freely therein, the second and third body members of the at least three body members extending from the first body member of the at least three body members and each contacting the horizontal conveyor surface of the conveyor belt and self aligning the seal with the horizontal conveyor surface such that the rounder bar seal effectively forms a seal. The rounder bar seal contour can be at least one of a spherical, ovoid, spheroid, cylinder with spheroid ends or cylindrical contour.

Moreover, the above aspects and advantages of the invention are illustrative, and not exhaustive, of those which can be achieved by the invention. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. Thus, these and other aspects and advantages of the invention will be apparent from the description herein, both as embodied herein and as modified in view of any variations which will be apparent to those skilled in the art.

BRIEF DESCRIPTION OF THE FIGURES

Exemplary embodiments of the invention are explained in greater detail by way of the drawings, where the same reference numerals refer to the same features.

FIG. 10 shows the prior art rounder bar of FIG. 1 in the camber position shown in FIG. 5 while engaged with a material portion.

FIG. 11 shows an isometric view of an exemplary embodiment of the instant invention.

FIG. 12 shows a cross sectional view and a detail view of an exemplary embodiment of the instant invention.

FIGS. 13 and 14 shows the exemplary embodiment of the instant invention shown in FIG. 12 with different camber angles.

FIG. 15 shows a cross-sectional view of the height adjusting device of the instant invention and the camber adjustment element.

DETAILED DESCRIPTION OF AN EXEMPLARY EMBODIMENTS OF THE FIGURES

Figure 1:
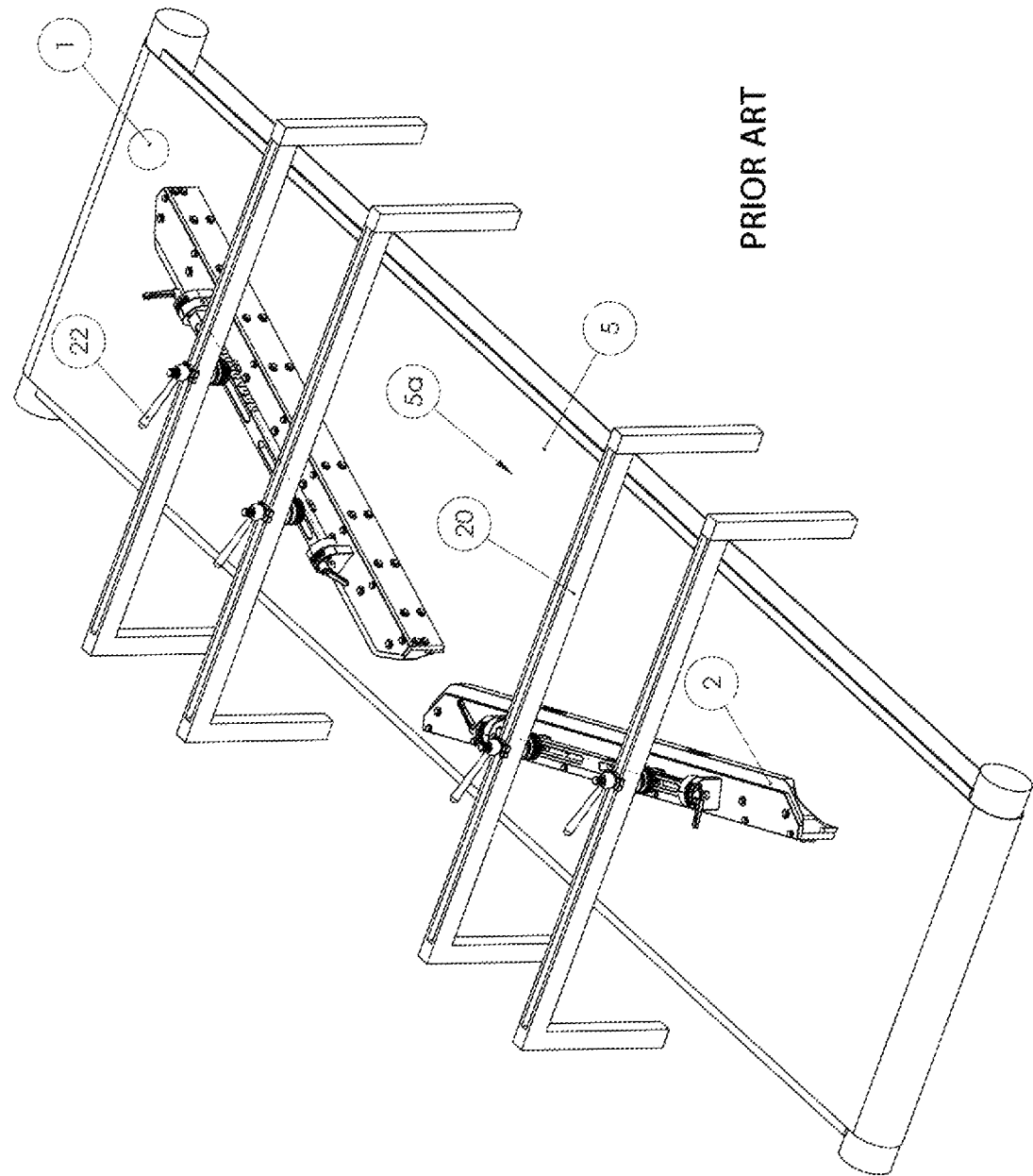
FIG. 1 shows an isometric overview of a prior art rounder

During operation of linear rounders, in a non-limiting example, the rounders take a portion of semi viscous material such as but not limited to bread, roll, pizza dough, or similar material and form them into rounded pre-baked products. A portion of semi-viscous material or dough portion 1 is typically taken from bulk raw dough and removed as a rough portioned shape, for instance as non-limiting examples, starting as a brick or cylinder or similar non-contiguous portioned shape. This rough portion is then reformed in most instances into, but is certainly not limited to, a final spherical, oblong, or similar desired product pre-baking shape. The process is commonly called rounding in the industry and is typically accomplished by mechanical method and machine known as a rounder, as shown in FIG. 1. This process is well known and documented/explained in previous applications by the others and the inventor under granted U.S. Pat. No. 10,306,896 to Schmidt, et. al, which is incorporated herein by reference.

FIG. 1 shows an isometric view of a prior art rounder. The semi viscous material portion 1 is introduced to the prior art rounder device 1 having an upper support structure or frame 21 which is coupled to a height adjustment device 22 and couples the support structure 22 to a rounder bar 2. The rounder bar 2 can be for instance in a straight line across or oriented diagonally across a moving conveyor belt 5 with a direction of travel 5a. In alternative orientations the rounder bar 2 is wound in a helical fashion around a rotating cone or in a cylinder, prior art examples known and contemplated but not shown in this application. In either case the dough portion 1 is introduced to the contoured rounder bar 2 in conjunction with the moving surface, in this example conveyor belt 5, which is below the rounder frame 20. In the exemplary embodiment of FIG. 1, the dough portion 1 is driven by the motion of the conveyor belt 5 in a direction so as to collide with the rounder bar 2 and produce a resulting force vector direction both against and along the axis of the rounder bar 2 and into the moving conveyor 5.

Figure 2:
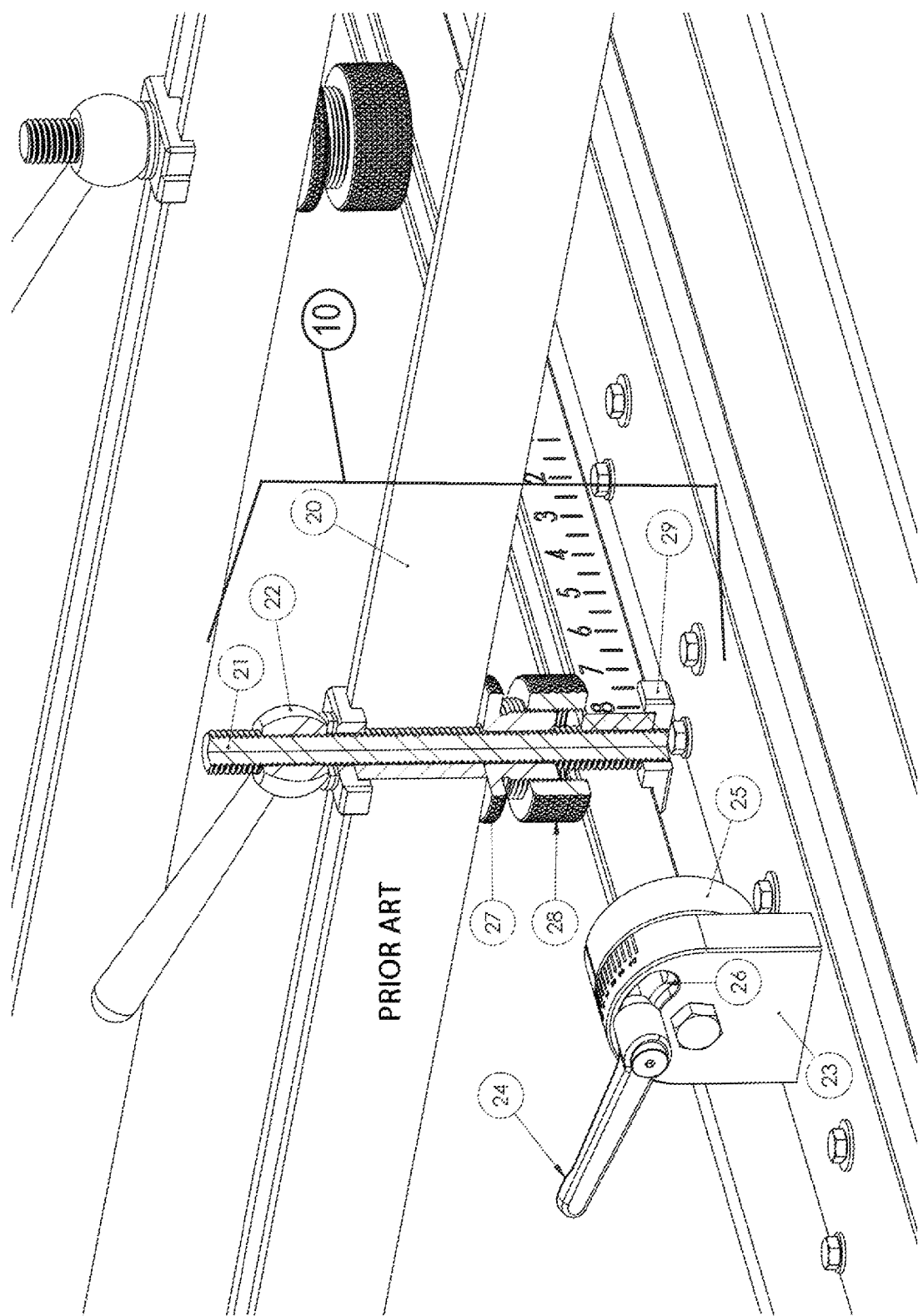
FIG. 2 shows a cut away of the height adjustment and a further view of the camber adjustment assembly of the prior art embodiment shown in FIG. 1.

FIG. 2 shows a cut away of the height and camber adjustment assembly of the prior art embodiment shown in FIG. 1. As shown, the adjustment mechanism 10, as better seen in FIG. 2, to lift the rounder bar 2 from the conveyor it is required to rotate the support rod fastener 22 about the support rod 21 which will move the assembly 10 and adjust the application of compression forces. The adjustment is accomplished by the height adjustment center 27 being held in a rotationally fixed position while the height adjustment ring 28 is rotated about the height adjustment center 27 so that the movement of those components can cause either retraction or extension as is required to make a proper setting of the seal 9 on the conveyor 5. The process can be used to extend or retract the height and thereby change the compressive forces on the seal and adjust. Additionally, as noted below in FIGS. 3-9, the angle or camber of the rounder bar 2 is also adjustable by operating the camber mount tensioner 24 and can also change the height of the bar as herein described below in relation to FIG. 3 in the prior art.

Figure 3:
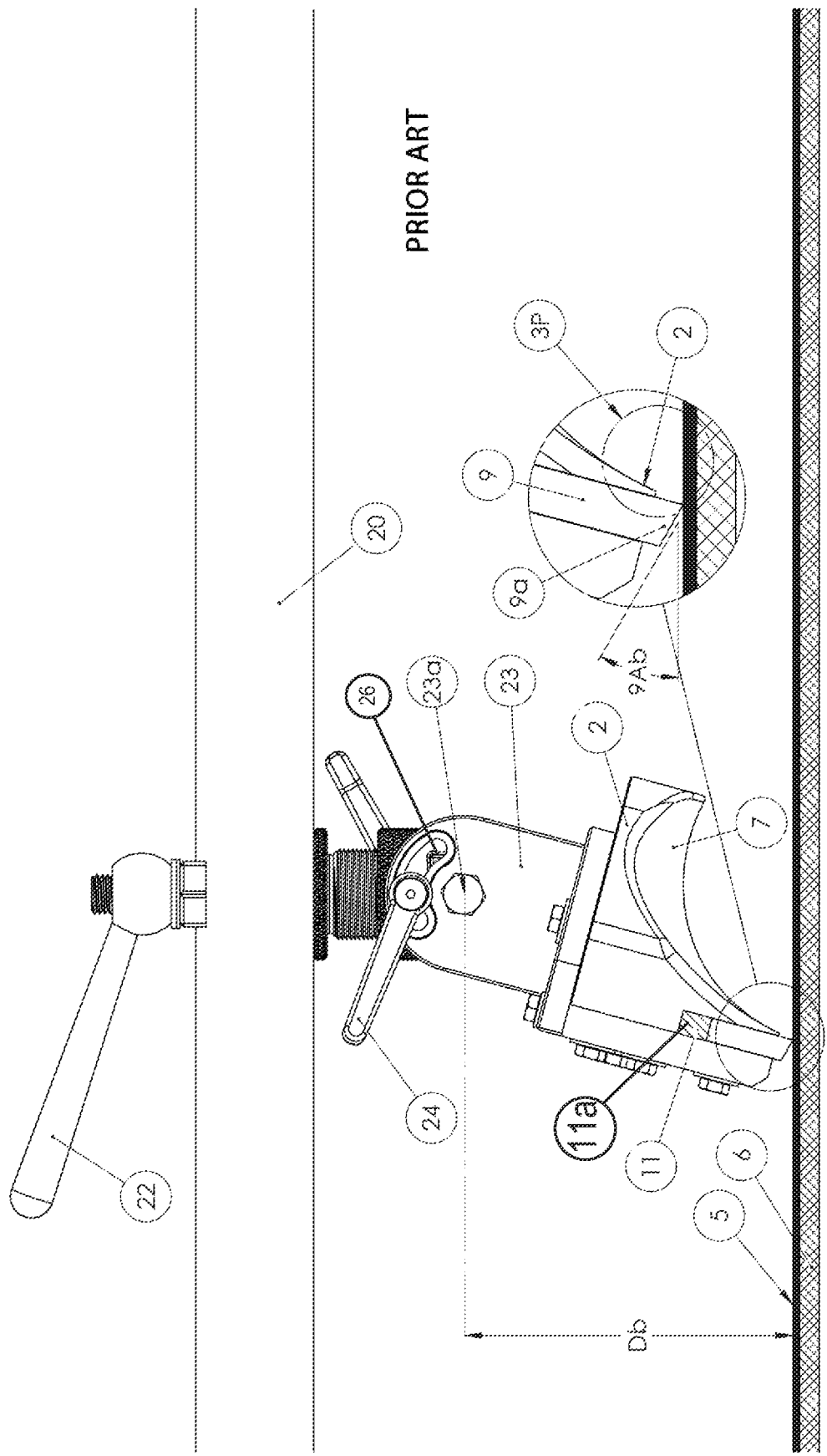
FIG. 3 shows a cross section view of the prior art rounder bar with the seal bar shown in FIG. 1.

FIG. 3 shows a cross section view of the prior art rounder bar shown in FIG. 1. FIG. 3 shows in greater detail the prior art conveyor as an assembly with conveyor belt 5, conveyor bed 6 with rounder bar 2, rounder bar contour 7, rounder bar seal 9, camber adjustment mount 23, camber mount pivot 23a, camber mount tensioner 24, rounder bar height adjustment device 10 with mounts to the support structure 20. At the bottom of the rounder bar is located a rounder bar seal 9 which is in intimate contact with the moving lower conveyor belt 5 for the length of rounder bar 2. The seal 9 is on a vertical plane relative to the conveyor 5 and is set at a diagonal angle to the direction of travel 5a as shown in FIG. 1.

The rounder bar 2 has a contour section 7. Typically these are fixed into the rounder bar 2. The sizes of the available rounder bar contours 7 may change to suit the sizes of final products such as but not limited to size of loaf of bread and/or the size of pizza such as large, medium, small or personal sized pizza or similar product variables. Similarly, the contours 7 may be varied along the length of the rounder bar 2. An example of this is shown by the various angles in the prior art example of the rounder bar 2 in each of FIGS. 3-5.

The rounder bar 2 of the prior art is in a substantially closed rotated orientation so as to have a smaller opening area to be able to round smaller dough portions 1 in FIG. 3. It should be noted that the height (Distance b or Db) from the center of the rounder mount pivot 23a to the conveyor belt 5 will be less than in FIG. 4. This difference in height adjustment will be accommodated by adjustment of the height adjustment device 10 through actuator as described above in relation to FIG. 2. As noted, in the prior art, this height adjustment device requires manual rotation of the outer ring 28 in relationship to the inner threaded ring 29, as shown.

When changes in product size occur, they may often be subtle and so the rounder bar size 2 can accommodate these subtle changes in sizes without further gross adjustment. However, sometimes the changes in size can be significant such as in, for example but certainly not limited to, a fifty to one hundred percent difference in the size of the material portion 1. In these instances where the shape of the rounder bar contours 7 may not be sufficient to accommodate the size of certain ranges and products the ability it provided to adjust for a significantly larger or smaller size of semi-solid material or dough portion 1. When this occurs typically the rounder bar 2 must be exchanged for one that has a different rounder bar contour 7 that is better sized to the size range of the semi-solid or dough portions that needs to be rounded. The rounder bar 2 can have a variable camber resulting from the contour 7 and the adjustment of the camber using camber adjustment lever 24 so as to provide a broader or larger size range of dough portions that can round by adjusting the camber of the rounder bar 2. However, this requires additional down time to accommodate the adjustments, change outs, and interrupts production. Additionally, as the system relies on manual adjustments, a level of human error is introduced into the height adjustment if it is not properly carried out.

The rounder bar 2 in these prior art devices can be rotated and cambered to the surface of the conveyor belt 5 with height adjustment device and the camber adjustment adjusted through the tensioner 24. The seal bar 9 is provided to glide upon the conveyor belt 5 contacting and sealing the rounder bar 2 with the belt 5 in reference to the material being moved on that belt. As can be seen in FIG. 3, when the seal bar 9 is held in a fixed direction it is held there with an allowable amount of vertical travel in the rounder bar slot 11 as dampened by the compression material 11a. When the rounder bar 2 is rotated to change its camber then the angle of the seat of the rounder bar seal 9 with engagement seal surface 9a as seen in the highlight, to conveyor belt 5 also changes. This coincides with the desire to maintain a seal on the dough or semi solid portion 1 contacting side of the rounder seal bar 9 while also having the contact angle 9ab of the rounder bar seal surface 9a.

Figure 4:
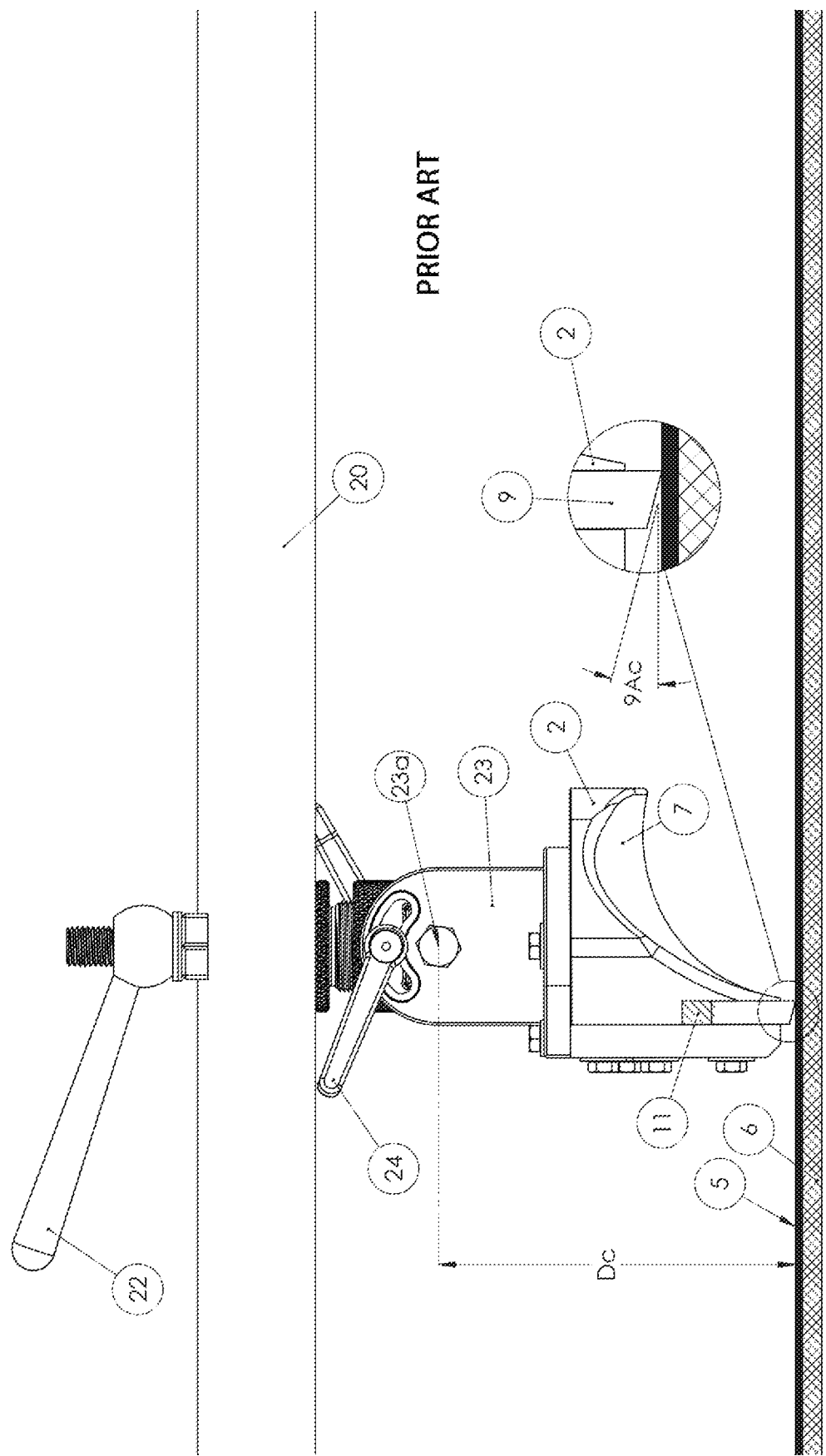
FIG. 4 shows in greater detail the prior art rounder bar of the prior art of FIG. 1 in a more open configuration.
Figure 5:
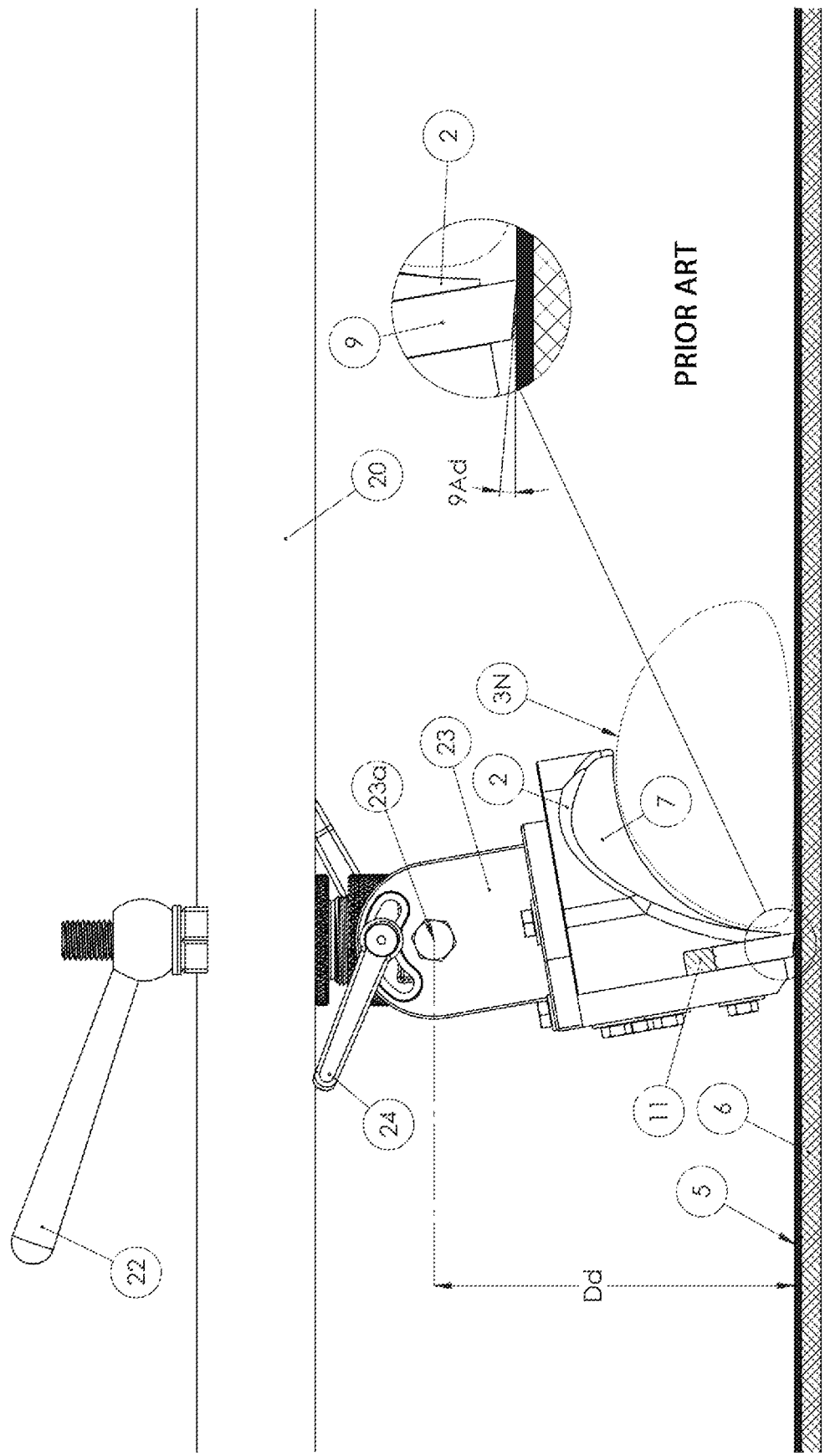
FIG. 5 shows in greater detail the prior art rounder of FIG. 1 at an even further open angle with a material portion.

The contact area of the seal surface 9a varies in its contact with the conveyor 5 as seen in the prior art throughout FIGS. 3-5. The camber can in some instances result in the seal surface 9a, as seen in FIGS. 5 and 10, being substantially parallel to the moving conveyor belt 5. This orientation drives the chisel shaped seal bar 9 with sealing element or surface 9a such that it avoids high point contact loading of the seal bar 9 relative to the moving belt and the resulting high heat generation from friction at the seal face or contacting area or seat or surface 9a. However, in the majority of other camber settings including in particular those described in FIGS. 3 and 4, the rounder bar seal surface 9a has a smaller contact area and is less parallel and more perpendicular or even further angled relative to the conveyor belt 5. This smaller contact area of the rounder bar seal surface 9a results in higher point loading, higher friction and more heat and wear.

The camber angle 9ab is shown and represents the angle that the seal surface 9a of the rounder bar seal 9 makes to the conveyor belt 5 in FIG. 3. The camber angle and the relative angle of the tilt of the rounder bar seal relative to the conveyor 5 can, as a non-limiting example, extend from about 25 degrees forward inclined as in FIG. 3 to 25 degrees backward inclined as in FIG. 5. In this position the camber angle 9ab is at its largest forward value relative to the conveyor belt 5 as compared to FIGS. 4 and 5. This angle creates the highest point load on the rounder bar seal surface 9a to conveyor belt 5 as the seal bar chisel shape geometry is generally oriented in the direction of travel of the conveyor belt. This higher loading causes both wear on the seal bar or rounder seal 9 and its surfaces as well as wear on the conveyor belt 5 and its surface. It also causes localized build up of heat as noted herein as an issue with the prior art since the friction is being concentrated at the limited contact point between the rounder bar surface 9a and the conveyor 5. This heat buildup is compounded by the fact that the limited contact point results in less surface area for distributing the higher forces. Finally, as the chisel geometry is pointing in the direction of travel with the smallest amount of contact area, it also has a high likelihood of leakage and/or pinching as shown and described herein.

As the camber angle 9ab that the seal bar surface 9a makes to the conveyor belt 5 decreases, as seen in further FIGS. 4 and 5, it enlarges or widens the contact surface area of rounder bar seal 9 and opens its profile 7 as well as lowering the contact friction as a function of the decrease in load over area to support the load so that the friction per area is reduced and thereby decreases the friction heat generation and resulting possible heat damage to the rounder bar seal 9 as well as conveyor belt 5 surface damage. However, this also decreases the functionality of the prior art rounder bar as the more open, larger contour is applicable to only larger dough portions. Similarly, improvements over the prior art can be found in automation of the height adjustment to remove the potential for operator errors and adjustment losses in the instant invention as noted below as well as allowing for rotation, self-righting and stabilization of the seal bar member as shown in the exemplary embodiment of the instant invention.

FIG. 4 shows in greater detail the prior art conveyor of FIG. 1 in a more open configuration. The rounder bar 2 with rounder bar contour 7 is further opened through the camber adjustment mount 23, camber adjustment mount pivot 23*a*, height adjustment device and upper support structure 21. The rounder bar 2 is in a substantially rotated open orientation so as to have a larger opening area that that previously illustrated in FIG. 3 so as to be able to round larger dough portions 1. It should be noted that the distance Dc from the center of the camber adjust mount pivot 23*a* to the conveyor belt 5 will be greater than in FIG. 3. This difference in height adjustment will be accommodated by adjustment of the height adjustment device as noted herein.

At the bottom of the rounder bar 2 is located the rounder bar seal surface 9*a* which is in intimate contact with the moving lower conveyor belt 5. For the length of the rounder bar 2 is on a parallel plane to the horizontal plane of the conveyor bed 5 and is set at a diagonal angle relative to the direction of travel 5*a* to the moving lower conveyor belt 5. Notice should be given to the camber angle 9*ac* that the seal surface 9*a* of the rounder bar makes to the conveyor belt 5. In this position the angle of the seal bar surface 9*a* makes to the conveyor belt 5 is less acute than in FIG. 3 where the camber is set to be best suited to round smaller dough portion 1 but is still at an angle less than that in FIG. 5 with the reduced camber angle 9*ac* of seal bar surface 9*a*. The rounder bar seal 9 of the rounder bar 2 is substantially vertical or perpendicular to the horizontal plane of the conveyor belt in the example of FIG. 4. From FIG. 3 to FIG. 4 the angle that the rounder seal bar surface 9*a* makes to the conveyor belt 5 changes, but the contact surface area remains the same. The load is less as the geometry is not as disadvantaged and the contact friction is lowered. Therefore, as a function of the decrease in force loading over area to support the load so, the friction per area is reduced and thereby decreases the friction heat generation and resulting possible heat damage to seal as well as belt surface damage. In this orientation, the chisel shaped seal bar is perpendicular to the surface it is scraping. This results in a very small contact area, similar to that in FIG. 3, but less force is needed since the chisel point is being pushed down by the force to create the contact area versus being pushed up or wedged. Though this requires less force than in FIG. 3, the contact area of the seal is still similar and does not function advantageously with the chisel geometry. It is also common to have this orientation in rounding machines.

FIG. 5 shows in greater detail the prior art rounder of FIG. 1 at an even further open angle. Conveyor belt 5, rounder bar 2 with rounder bar contour 7, camber adjustment mount 23, camber mount pivot 23*a*, height adjustment device and upper support structure 20 are shown. The rounder bar 2 is in a fully rotated open orientation so as to have a larger opening area so as to be able to round larger dough portions 1. It should be noted that the height from the camber mount pivot 23*a* to the conveyor belt 5 Dc (Distance c) is less than in FIG. 4. This difference in height adjustment will be accommodated by adjustment of the height adjustment device, as better seen in FIG. 2. Again, rounder bar seal surface 9*a* which is in intimate contact with the moving lower conveyor belt 5. The camber angle 9*ad* is shown that the rounder seal bar surface 9*a* of the rounder bar 2 makes to the conveyor belt 5. In this position the rounder bar seal surface angle 9*ad* is less than what was seen in FIGS. 3 and 1C and is approaching parallelism to the horizontal surface of conveyor belt 5. The contact area is greater in this position than in both the FIG. 3 and FIG. 4 positions, distributing the applied forces over a greater contact area as well as orienting the geometry of the chisel shaped bar such that it is mechanically advantaged in that the contact with the material uses the wedge shape to further reinforce the seal. This is the most efficient position in the prior art.

Figure 6:
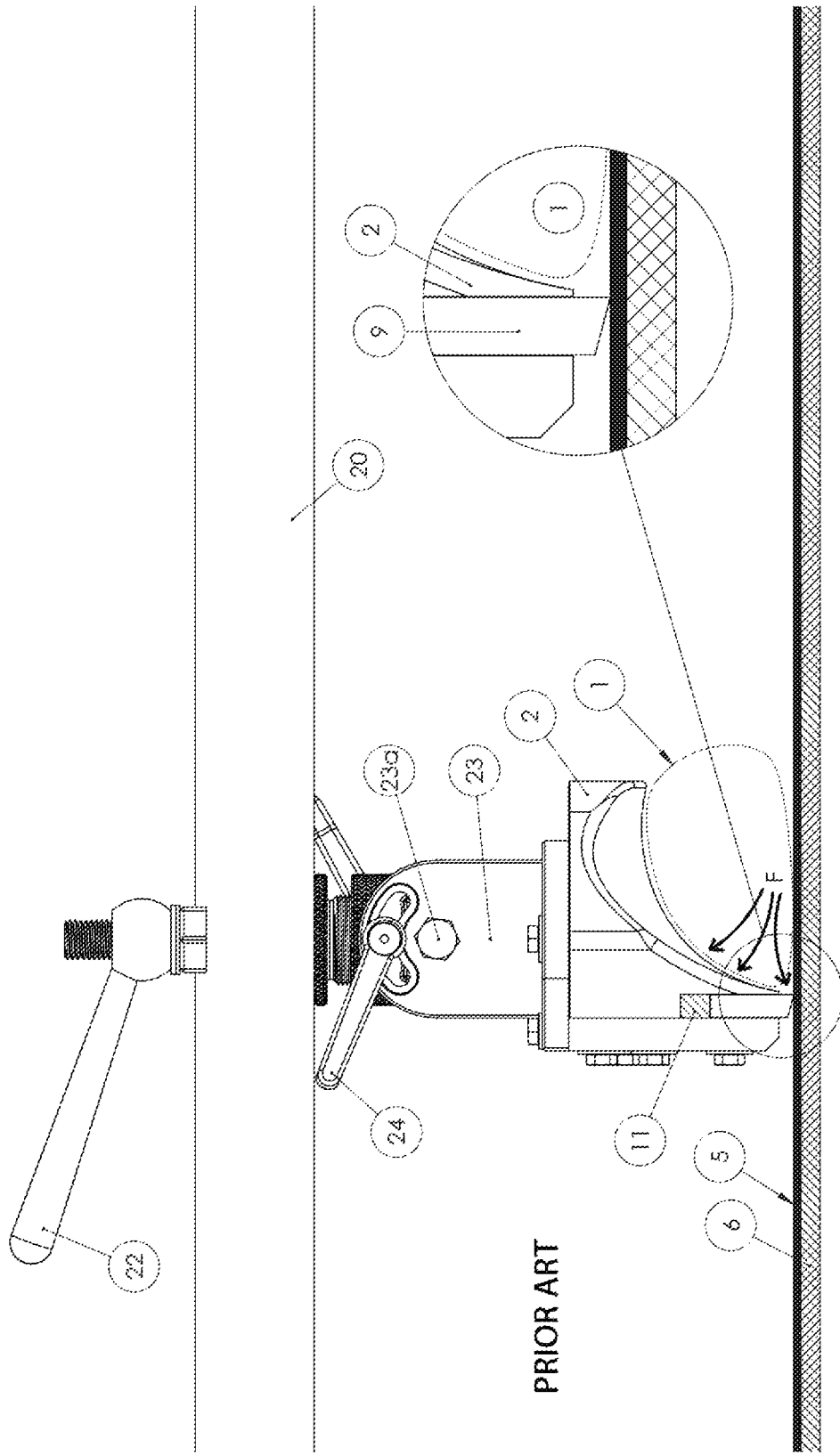
FIG. 6 shows the prior art rounder bar of FIG. 4 engaged with a material portion.

FIG. 6 shows the prior art rounder bar of FIG. 4 engaged with a material portion. Prior art rounder bar 2, with rounder bar seal 9 operates against the moving conveyor belt 5 so as to create rounded dough portions 1 as shown. The rounder bar seal 9 of the rounder bar 2 is substantially vertical or perpendicular to the horizontal plane of the conveyor belt in this example. This position is particularly detrimental in the seal provided by the rounder bar seal 9 to the conveyor belt 5. The point loading is maximized at the tip in FIGS. 3 and 8, but is still high for the point of the seal portion 9*a* in this instance as well. As noted, it is less in this location in FIGS. 4 and 5, but in all instances the cantilevered extension of the wedge shape in the prior art that is the only portion in contact with the conveyor 5. Having such a high load factor results in high frictional wear and the rounding of the edge of the surface as well as higher heat, both undesirable, as better shown in FIG. 7. Further, though the lifting forces are lower than that in the immediately following FIG. 8, the forward impact forces and the narrow contact patch of the tip makes it easier to push or float with upward forces from the movement of the dough against the rounder bar or from other forces such as those that can occur from vibration. Such separation can result in pinching and tearing of the dough portion 1 similar to that shown in FIG. 8.

Figure 7:
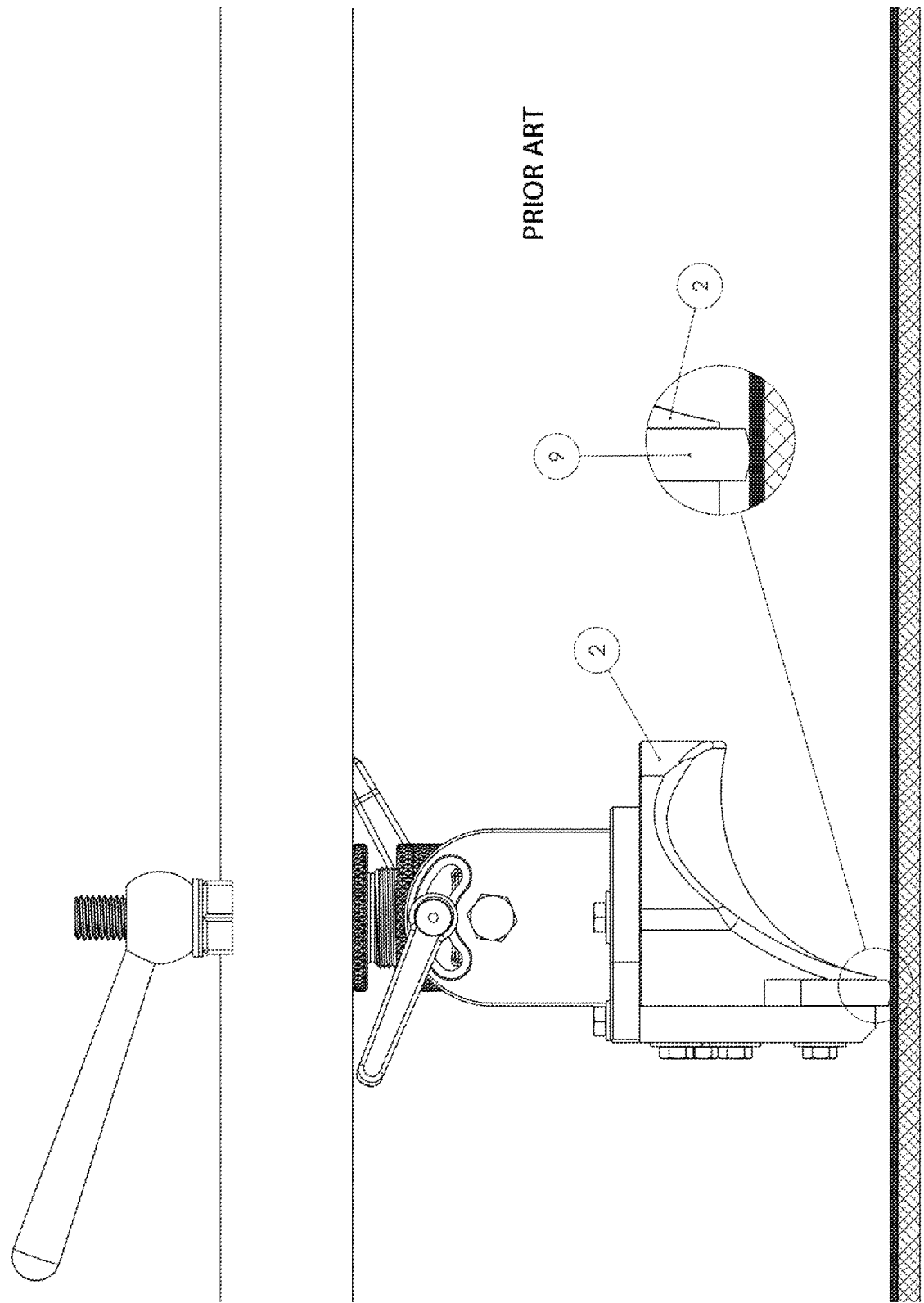
FIG. 7 shows a cross section of a worn rounder bar seal from FIGS. 6-9.

FIG. 7 shows a cross section of a worn rounder bar seal from FIGS. 6-9. FIG. 7 shows a typical wear pattern or shape of the seal surface 9*a* of the rounder bar seal 9 become due to operation in varying angles of rounder bar 2 camber settings when the rounder bar seal is rotated and operated in various camber orientation positions and run against conveyor belt 5. The big issue with this wear pattern is that the seal looses all or significant ability to seal and scrape dough from the belt. And if the radius at the front of the seal bar is significant as shown in FIG. 7 then dough can easily wedge into the radius area and pass under the seal with additional negative aspects as previously indicated.

Figure 8:
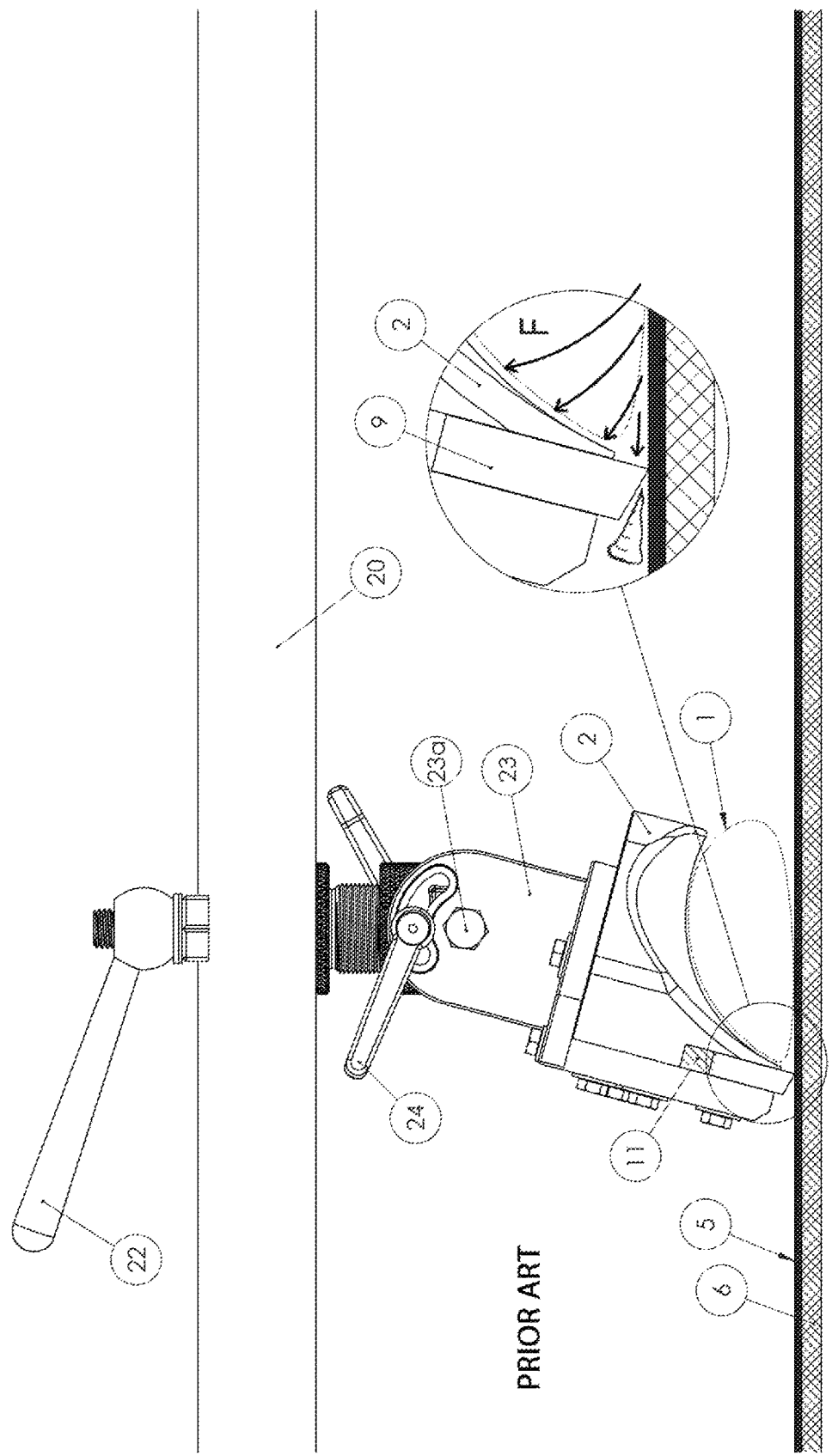
FIG. 8 shows the prior art rounder bar position of FIG. 3 engaged with a material portion and highlighting a leak in production.
Figure 9:
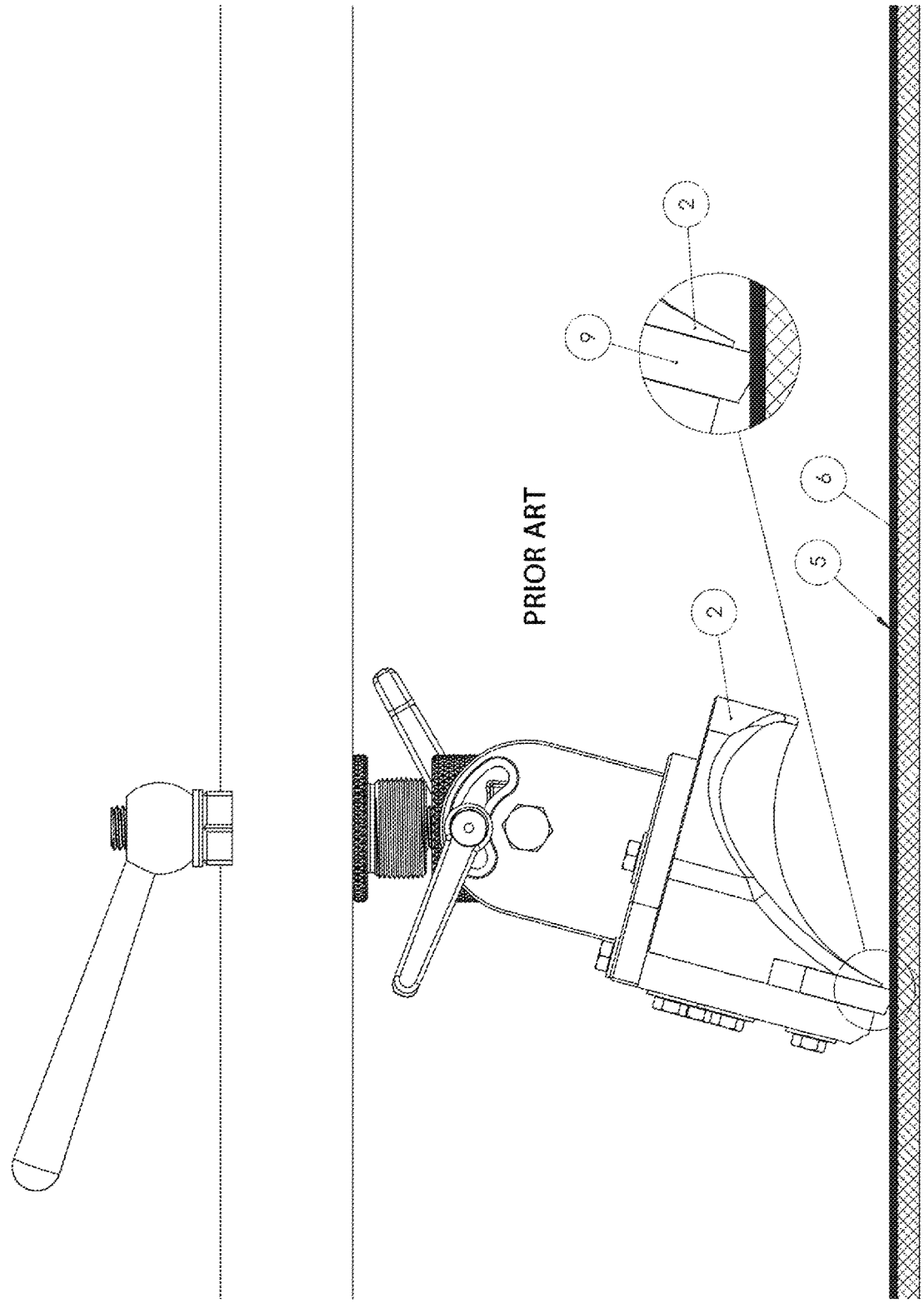
FIG. 9 shows the prior art round bar in the position of FIG. 3 showing typical wear on the seal bar from this position.

FIG. 8 shows the prior art rounder bar position of FIG. 3 engaged with a material portion and highlighting a leak in operation. FIG. 8 shows the still further cross section of the prior art rounder bar of FIG. 1 in operation in the position shown in FIG. 3 as previously described above. The prior art rounder seal bar 9 in a camber closed inclination where the seal surface of the rounder bar seal 9 is highly backward inclined and the seal surface is very sharply poised towards the conveyor belt 5.

The rounder bar seal 9 is further rotated so as to be on a forward inclined angle where the rounder bar seal 9 makes contact and its tip is outwards or ahead of the center of the rounder bar seal 9. Though the more aggressive forward angle impacting with the dough tends to lift from the conveyor belt 5 this orientation is still detrimental as it has a very high point loading factor spread along a very small contact surface resulting in similar issues as seen in the position show in FIG. 6 but with additional geometric forces working to cause leakage. Though the position of allows for less impact force on the rounder bar seal 9, the rounder bar seal 9 as its angled back and will scrape the dough portion 1 from the conveyor belt 5 it does so with only the smallest of contact patches or surfaces represented by the line formed by the front most tip of the seal surface 9a of the bar seal 9 and at a mechanical disadvantage. The dough is wedged into this geometry when in contact with the seal. As the tip is unsupported, this again leads again to high point loading, heat and wear from friction as well as the possibility, even from minor vibrations, of a leak or pinch occurring such that dough gets under the seal.

It can be seen in the highlight that when the dough portion 1 reaches the rounder bar scraper 9 it would be fully encompassed within the confines of the rounder bar contour 7. This encompassing effect of the rounder bar contour 7 then puts pressure on the dough portion 1 such that there is pressure on the dough portion 1 at the junction where the dough portion 1 meets the rounder bar seal 9 to conveyor belt 5. The arrows shown in the highlight approximate these forces on the dough portion 1 and how it runs into the rounder bar contour 7. The dough portion 1 effectively gets forced against the rounder bar seal 9 and back area of the rounder bar contour 7. This leads to high point contact forces and localized heating—the noted shortcomings of the prior art. This high loading force results in wear as highlighted in FIG. 9.

In addition to the heating and lifting forces from collisions shown in the examples of FIGS. 6-8, in both instances the dough portion 1 can be lifted as it is just sitting on the belt without being wedged or under forced compression to the rounder bar contour 7. When the dough portion 1 collides with the bar 2 as dough portion 1 rotates and is heated along the course of the travel from localized heating, the rounder bar seal 9 is going to be substantially subjected to hydraulic forces which will tend to "wedge" the dough into the area of the rounder bar seal 9 to moving conveyor belt 5 which acts to wedge the dough into this area and if the wedging force is great enough it can force the rounder bar seal 9 to lift and allow dough to pass underneath the sealing area of the rounder bar seal as seen in the callout. Additionally, the heating can release oils or liquefy other elements that can further "float" or gap the scraper bar. In either instance, the lifting can interrupt the contact of the seal bar 9.

These types of dynamics are typified in what is usually used in bearings that are subjected to high loads as in thrust loads on hydro-electric power generation shafts that support the turbine wheel, generator drive shafts and generator rotor (typically referred to as slipper bearings). In these applications the bearing has a slight wedge taper of the bearing entry surface and the gap decreases as the bearing surface rotates from the larger gap area to where the gap is tight and the operation is where oil gets entrained in this gap and will adhere to the surfaces and be drawn in to where the gap closes or goes tight, at this point some oil will flow out but the remaining pinched off portion will flow into and go thru the gap hydraulically floating the bearing surfaces apart. The well documented result being that the entrainment and wedging action imparted by the rounder bar thru this operation and rotation will float up due to the thrust load so that there will not be any metal to metal contact of bearing surfaces during high load operation.

In this operation where the rounder bar seal 9 is inclined so as to entrain the dough portion 1 into the wedge area, typically there can form a film of dough passing between the belt and the upper inclined seal or sealing surface. Another way of looking at what happens in a prior art rounder bar system where dough wedges in between the backward inclined rounder seal bar 9 and the moving conveyor belt 5 of FIG. 3 is that the dough at the interface where the rounder bar seal 9 surface meets the moving conveyor belt 5 that dough will be entrained and force its way thru and pass under the rounder bar seal 9 surface.

Although it can be argued that in the slipper bearing example the wedge entrainment angle is very small and that in standard operations of rounding bars it may be that the angle of inclination of the seal bar to the belt is much greater allowing for dough to flow away from the seal to conveyor point. However, the difference is in that when looking at a slipper bearing the fluid used for lubrication is significantly less viscous than dough and so the vast majority of the fluid subjected or presented to the bearing inlet point will simply flow away. In the case of dough, as in bread or roll dough, the dough is viscous and may vary from, for example and certainly not limited to, 25 degrees forward inclined to for example, but certainly not limited to, 25 degrees backward inclined as in FIG. 10 one can not ignore there is a portion of the dough that fills the contour area of the rounder bar contour 7.

The dough portion 1 being acted upon so as to be rounded will forcefully contact substantial surface area of both the rounder bar contour 7 and conveyor belt 5 which will hold to this dough portion 1 and the viscous nature of the dough portion 1 will not allow the dough portion 1 to move away from the rounder bar contour, but rather force or add force to the material portion 1 being presented to the rounder bar seal 9 surface and moving conveyor belt 5 interface point. This way the dough of the dough portion 1 is highly motivated to create a high pressure or force at the rounder bar seal 9 to conveyor belt 5 area with dough from the dough portion 1 to pass between the rounder bar seal 9 surface and the moving conveyor belt 5 as seen in the callout of FIG. 8.

Additionally, with the prior art seal bars that are held in the slot such that they are substantially perpendicular to the conveyor belt horizontal plane, as seen for example in FIGS. 4 and 6, the rounder bar seal 9 would be profiled to be on a slight angle to the surface of the belt and when the belt would entrain dough and pass the dough between the belt and the bottom of the scraper seal surface 9a the passed dough would or could start to buildup and dry onto the surface of the conveyor belt where this dried on dough would form a hard surface, often harder than the surface of the rounder bar seal 9, and thus the rounder bar seal bar contact surface would start to wear or ride over the dried portions.

The smaller contact area created by the higher angle of the rounder bar seal area or surface 9a relative to the conveyor belt 5 in FIGS. 3-4 and 6-9 creates and the nature of the semi-viscous material can lead to a very small "float" or hydraulic force being capable of lifting the round bar seal 9. Although this can be resolved by increasing downforce on the rounder bar 9 and/or rounder bar seal 9a, the contact with a greater down force can cause increased friction and result in deterioration of both the seal bar and the conveyor. The seal bar can also "round" reducing its effectiveness and changing the pressure requirements throughout the run as well as potentially adding contaminants from frictional forces.

FIG. 10 shows the prior art rounder bar of FIG. 1 in the camber position shown in FIG. 5 while engaged with a material portion. One can see that if the rounder bar seal 9 is rotated so as to be on a forward inclined angle where the rounder seal bar seal 9 contact tip is outwards or ahead of the center of the rounder bar seal 9. Unlike the previous camber positions, this position provides an angle which tends to lift or peal the dough from the conveyor belt 5 is most effective. The dough can be lifted as it is just sitting on the belt without being wedged or under forced compression to the rounder bar contour 7. However this, as noted, is only one of the typical camber settings. The prior art rounder bar seal 9 and rounder bar seal surface 9a shown, even in this position is still problematic in that the leading edge of the seal 9a is cantilevered without significant support. This results in higher than necessary compressive forces. Additionally, during operation this has a tendency to deform the tip.

The prior art solutions do not allow for a mechanism for the seal bar 9 and seal bar surface area 9a to maintain an angle of attack to the dough portion 1 relative to the conveyor belt 5 such that it allows for the seal bar 9 to ride on the horizontal plane of the conveyor belt and present a substantially similar sealing angle of attack regardless of the camber or angle changes of the contoured bar relative to the conveyor belt surfaces. By contrast, the exemplary embodiment of the instant invention is designed such that it automatically swivels to adjust and maintain its relative angle and thereby maintain its scraping efficiency viz a vis its angle of attack relative to the material portions, reduce the potential for leakage under the seal, and reduce point loading and thereby wear. It is also coupled to a unique auto adjusting leveling system that maintains the relative pressure of the flexible, rotatable sealing element with the conveyor belt, assuring that wear is further reduced. Finally, an automated height adjustment solution is also provided.

FIG. 11 shows an isometric view of an exemplary embodiment of the instant invention. The non-limiting exemplary embodiment of the instant invention is provided comprising a rounding device 100 which rounds a material portion or dough portion 201, the rounding device 100 with a frame or support structure 220 and a rounder bar 202 coupled thereto. A conveyor belt 205 is provided having a conveyor bed 206, rounder bar 202, camber adjustment assembly, upper support structure 220, an automatic height actuator or self-adjusting pressure device 221 that maintains downward pressure on the rounder bar and self adjusts based on changes in camber and orientation of the sealing bar 209 during setup and operation. A camber adjustment lever 224 is also provided (as best seen in FIG. 12), this lever allows for adjustment of the camber of the rounder bar 202 relative to the surface as further shown and explained in relation to FIGS. 12-14 herein below.

FIG. 12 shows a cross sectional view and a detail view of an exemplary embodiment of the instant invention. FIG. 12 shows in greater detail the conveyor belt 205, contoured rounder bar 202, rounder bar contour 207, an automatic height actuator 221 which mounts to the overhead support structure 220 and self-adjusting, rotatable rounder bar seal 209 of the exemplary embodiment. As can best be seen starting in FIG. 12 and further shown in FIG. 13, the adjustable, articulating rounding bar 202 is coupled to the upper support bar 220 by a support rod 222, this is coupled through the automatic height adjustment device 221 as described herein below. The contoured rounder bar 202 is further coupled to the camber adjustment mount 223 through the camber adjustment mount pivot center 223a. A camber adjustment tension arm 224 is shown in a camber adjustment track 226 that allows the rounding bar 202 to rotate in the camber adjustment track 226 and adjust camber on the rounder bar 207. At the juncture of the rounder bar 202 with the conveyor belt surface 205 a contoured sealing bar element 209 is shown.

At the bottom of the rounder bar 202, as can best be seen in FIG. 12, the novel rotatable rounder bar seal mount contour body 209c is shown. The rounder bar seal 209 has a seal mount contour 209c that extends from the rounder bar seal 209 and which mates to the contour of a channel 207c in the bottom of the rounder bar 207 so that the rounder bar seal is rotatably mounted in contour 207c. The rounder bar seal 209 has a further novel, rotatable rounder bar front seal element or leg or projection 209a which projects forward from the rounder bar seal for lifting or pealing a dough portion 201 from the moving conveyor belt 205 as shown in FIGS. 12 to 14 but without substantial issues from lift or localized heating and wear as seen in the prior art.

To create such a seal that can rotate to always maintain a consistent and proper seal against the conveyor belt 205 with the seal able to always sit at the same or a very consistent angle or orientation to the conveyor belt 205. To be able to always have this constant position or relationship position of rounder bar seal 209 to conveyor belt 205 there must be a point where the rounder bar seal 209 can rotate or be rotatably mounted to rounder bar 202. This rotatable aspect can be seen in FIGS. 12 to 14 where the rotatable seal bar 209 can rotate in conjunction with rounder bar 202 thru the utilization of mated rotatable surfaces 207c and 209c and through a variety of camber angles to maintain its profile and consistently require similar down force pressures with minimal adjustment.

To support the rotatable rounder bar seal contour body 209c forward projecting surfaces in its shown orientation rounder bar seal front element 209a is balanced by rotatable rounder bar seal rear section or leg or surface or element 209b which is mirrored about the pivot point of center of rounder bar rotational contour 209c and each of the at least two sections or legs 209a and 209b are on either side of the rounder bar seal contour body 209c. It should be noted that 209b and 209a can be but also are not required to be equally centered from the center of 209c to operate as desired or intended and that these distances or distance relationships or dimensions can be altered without departing from the intent of the invention.

The rotatable rounder bar seal front surface 209a and rear surface 209b are also contoured in such a fashion that it has a relatively constant cross section surface width so that as it wears the seal surface always stays relatively the same in seating width and/or cross sectional area until a point where the separation of the legs is no longer existing. The seal bar contact surface 209a or 209b will widen and it will need to be replaced, but it does so at a slower rate and at a consistent pressure dynamic relative to the higher contact point pressures exerted at the angles shown in the prior art.

FIGS. 13 and 14 show the exemplary embodiment of the instant invention shown in FIG. 12 with different camber angles. The progression from FIGS. 12 to 14 show how the instant invention with its self-adjusting, self-leveling sealing elements maintains its level orientation with the conveyor belt 205 and provides a consistent seal orientation with the front face element 209a keeping a consistent configuration in the cross-sectional views.

The contours of the sealing element 209 are particular to the invention and allow for consistent downward force to be placed upon the sealing bar element 209 whilst maintaining a downward pressure force using the height adjustment mechanism 221. The sealing bar 209 having contour body 209c which is seated in a sealing bar channel 207c as described above. In the non-limiting exemplary embodiment shown in FIG. 12, the channel is shown as a semicircular channel 207a. Though described herein as semicircular, the shape of the body can be but is not limited to being spherical, ovoid, spheroid, cylindrical, cylindrical with spherical ends (e.g. hot dog shaped) or the like so as to provide rotation of the principal contour body 209c relative to the rounder bar 202. Similarly, the rounder bar seal 209 can be constructed of a suitably pliant material. As seen in the highlight FIG. 12 the rounder bar sealing element 209 extends from the sealing bar 202 from the channel 207c with a forward bias portion or element 209a which is consistently forward facing and geometrically stable and mechanically advantaged so as to aid in the removal of the semi-viscous portion 201 efficiently from the conveyor belt surface 206.

To support the positioning of the forward bias portion 209a and trailing portion 209b of the sealing bar element 209c, the sealing bar element 209c is held in place and orientation by the consistent pressure of self-adjusting pressure device 221. To prevent the reversal, slipping, or deformation from forming forces on the forward bias portion 209a rearward extending stabilizing element 209b biases the sealing element 209 and act to spread the downward pressure force from the self-adjusting pressure device 221 along both the rearward extending stabilizing element 209b and the forward bias portion 209a. The sealing element 209 also remains oriented horizontally on the horizontal surface or conveyor bed 206 of the conveyor belt 205 as each leg helps to level the sealing element 209 which can self-adjust to the camber of the rounder bar 202 as it is adjusted. The sealing bar 209 moves within the sealing mount channel 207c and is free to rotate as the forward bias portion 209a and rearward extending element 209b settle on the conveyor belt surface 206.

These mounting configurations allow for rotational motion of the rotatable rounder bar seal 209 so as to allow for the rotatable rounder bar seal 209 to always seat squarely to the conveyor belt 205 all the while providing a soft continuous contour of rounder seal bar 209 to rounder bar contour 207 so that as the rounder bar 202 is rotated to change its a camber aspect, the rotatable seal bar 209 can freely rotate to accommodate changes in rotational attachment and still provide a smooth transition of rotatable rounder bar seal 209 motion to rounder bar 202. Though the existing configuration is shown as a semi circular element, similar shapes providing the amount of rotation required would perform similarly and are equally applicable to the invention. Similarly, though a single forward biased portion and rearward bias portion are shown forming two contact points with and arch therebetween, these particulars can be adjusted without departing from this aspect of the invention. In particular a self-stabilizing sealing bar with an at least one forward facing and an at least one rearward stabilizing contact portion is contemplated and shown.

In addition to the self-adjusting, rotating seal bar 209 with its balanced configuration having an at least two sealing legs or protrusions to maintain its orientation on the conveyor, an automatic height or pressure actuator or device 221 is also provided to enable the instant invention to more easily accommodate changes in height caused by changes in rounder bar 202 camber adjustment settings and wear in the instant invention as well as maintain downward pressure even during operation. For example, in FIG. 12 the rounder bar 202 is in a substantially rotated closed orientation similar to that of FIG. 3 so as to have a smaller opening area so as to be able to round smaller dough portions 201. It should be noted that the height from the center of the camber adjustment mount pivot 223a to the conveyor belt 205 varies in the figures showing the progression of changes in such height. Similarly, FIGS. 13 and 14 show various camber positions similar to those of FIGS. 4 and 5. Each having different angles of inclination of the rounder bar 202 to the conveyor belt 205. In each instance, as seen in FIGS. 12-14, the sealing element of the instant invention maintains its orientation. The rounder bar seal 209 is self-adjusting and self-righting in this respect.

FIG. 15 shows a close up of the height adjusting device of the instant invention and the camber adjustment element. FIG. 15 shows the automatic height adjustment device 221, a control rod 222, mounting element 228a, mounting bracket or clamp 228b. The height adjustment device 221 is affixed to support frame 220 through the mounting bracket or claim 228b. The mounting element or nut couples the bracket 228b to the frame 220 and a retention element 229 coupling to the rounding bar 202. The control rod 222 is allowed to move freely with one end coupled to the rounding bar 202 by the retention element 229. By means of a cut away of the actuator 221, which is shown here in one exemplary, non-limiting embodiment as an air cylinder, the adjustment device or air cylinder 221 accommodates the height adjustment requirement of the rounder bar 202 as gas filled cylinder and piston. This height adjustment actuator 221 is not limited to the use of an air cylinder and other devices or types of actuator can be used in place of this actuator without departing from the intent or spirit of the invention. In addition to providing for the difference in height adjustment required the height adjustment device 221 also holds and maintains the relative horizontal position of the rounder bar 202 and, thereby, the sealing element 209, attached thereto. This allows for consistent pressure to be exerted as programmed or set by the operator regardless of the relative position of the rounder bar 202. That is adjustments in camber or variances during operation can be absorbed or corrected by the automatic height adjustment device 221 avoiding the pitfalls of the prior art.

The invention contemplates other ways to provide for self compensating height with constant pressure, height, or down force down on rounder bar 202 in the rounder device 1. One of many other systems for this compensation function can be a combination air over hydraulic system where the illustrated air cylinder is replaced with a cylinder that can utilize oil and or air and oil under pressure and provide the downward force and the air over hydraulic chamber will provide for the consistent hydraulic force. Another example can be a cable system and a loaded weighting system or biasing means acting upon the cable system to provide for the constant downward force that it would exert upon the rounder bar and seal. Finally, a system using electric stepper motors or micro adjustable electric actuators or similar devices to these systems can be utilized.

The actuator of the exemplary embodiment being an air cylinder provides the constant downward force upon the seal bar 209 for the benefits of quick responses to deviations in the moving conveyor belt 205 thicknesses 205 which could produce a need for the rounder bar 202 and seal bar 209 to extend where the compressed medium such as but not limited to air or other gasses such as but not limited to nitrogen and the like can expand marginally or compact rapidly to compensate for these quick deviations in height. This height adjustment actuator is not limited to the use of an air cylinder and that other devices or types of actuator can be used in place of this actuator without departing from intent or novelty of this invention. In addition to providing for the difference in height adjustment required the actuator also holds and maintains the relative horizontal position of the rounder bar.

Turning now to the operation of the exemplary embodiment of the instant invention, in the rounding of semi viscous portions typically such as in roll, bread, pizza dough and similar materials the dough portion of varying sizes will be deposited onto the moving conveyor belt 205, similar to the operation shown in U.S. Pat. No. 10,306,896, which has been incorporated herein by reference. The conveyor belt 205 will then carry the portions to the entry area 208 of the rounder bar contour 207 where the dough portions 201 will engage the entry area 208 and then be motivated to the rounder bar contour 207 of the rounder bar 202 and due to the angled position of the rounder bar 202 to the direction of the travel of the conveyor belt direction 205a the dough portion 201 will engage the rounder bar 202, start to roll and thru the forces induced on the dough portion 201 by the moving conveyor belt 205 and the rounder bar 202 placed at an angle to the path of the conveyor belt travel direction 205a that the dough portion 201 will continue to roll against and inside the contour of the rounder bar contour 207 so as to become rounded. To facilitate different sizes of dough portions 201 the rounder bar 202 can be rotated or cambered so that the rounder bar 202 can rotate about a longitudinal axis so as to decrease or increase the area between the contour of the rounder bar 207 and the moving conveyor belt 205.

For this to occur the camber adjustment 224 is rotatably disengaged but not limited to rotational engagement and disengagement and the rounder bar 207 and rotated so as to create a smaller open cavity area which would suit or better suit the operation of rounding smaller dough portions. For the rounding of larger dough portions the rounder bar 202 will be rotated so as to create a larger open area between the contour of the rounder bar contour 207 and the moving conveyor belt 205. The larger dough portion 201 will then pass thru this rounder bar contour 207 area so as to emerge in a rounded state.

Issues with prior art rounder bar occur with the need to manually, with the aforementioned possibility of errors and mis-adjustments, change the height of the rounder bar when changes in camber adjustments are made. As seen in the description of the prior art in FIGS. 3-9 above, it can be seen that the camber adjustment mount of the prior art has a pivot center 23a will change in height to conveyor belt 5 as the rounder bar 7 is rotated. This change in vertical height will need to be compensated for by changing adjustment by turning the height adjustment nut 28 in prior art machines while holding the height adjustment center 27 stationary. Issues arise in that operators that may not fully understand and comprehend how to make and confirm proper height and so may not do it properly. Height adjustment issues being if the height of the pivot point to the belt is adjusted to be lower than required then the amount of compression that will need to be accommodated in the rounder bar seal biasing means 9a may be too great and so corresponding (linear compounding) pressure exerted will be too high producing surface contact pressures between the belt and the seal which causes higher temperature due to higher friction. This can cause excessive conveyor belt 5 failures and rounder bar seal 9 damage in prior art machines.

For example FIG. 3 shows the prior art system whereby the dough portion in the rounder bar that is more closed and when one needs to round larger portions of dough 1 the rounder bar 2 may be rotated more so as to increase the area of the rounder bar 2 to conveyor belt 5 as in FIG. 4 and when going to an even larger opening such as in FIG. 5. This rotation of the rounder bar 2 is carried out as stated and shown in the previous U.S. Pat. No. 10,306,896 to Schmidt where the camber adjusting tensioner or lever 24 may be released so as to release the rounder bar 2 and allow it to be rotated. To change the open area of the rounder bar 5 to conveyor the rounder bar 2 may be rotated by grasping the rounder bar and rotating it to the desired degree or amount of opening. A reference scale or means to provide a repeatable opening position for holding to a standardized opening position may be done by using a reference indicator point and a scalar value where to change from one size to another one would rotate the bar to line up pointer or reference point to the required scalar value. These adjustments are subject to human error and operator experience. Additionally, the prior art cannot accommodate changes during operation that may occur from wear or uneven surfaces or the like.

By contrast, as shown in FIGS. 11-15, the invention provides a system, device, and means to automatically make height adjustment that are consistent and correct for when an operator makes an adjustment to the camber of the rounder bar as well as accommodate issues during operation. This aspect of the invention helps to accommodate the issues in the prior art where prior art rounder bar seals had an angle machined into the length of the bars so as to seal to the belt in a fixed position which was later modified to also be when the rounder bar has its camber adjusted so as to suit the size of dough portion that was to be rounded.

The instant invention has several positive attributes in that it provides for a self-adjusting, rotating, stabilizing sealing bar sealing element coupled to an automatic height or pressure actuating system. This addresses several shortcomings in prior art where permanently machined, seal contact angles on non-articulating seal members create high loads on very small contact surface areas which create higher localized friction values. Higher frictional heat generated can cause the previously indicated failure or damage to both seal surface and rounder belt 5. Prior art seal bar systems and or profiles also produced the situation where if the rounder bar seal 9 to conveyor belt 5 contact angle were not optimal and could be conducive to wedging or forcing dough under the seal. Positive aspects of the invention are to create a seal profile that always maintains an optimal contact or seal to the conveyor belt 5 so as to minimize seal contact forces and subsequent heat, wear, damage issues, and to create a means of automatic height compensation for the rounder bar seal to overhead support when changes in rounder bar camber are made and to decrease an issue of where in prior art rounder bar seals were located in an area that created a blemish on the dough portions that typically ran against an area that we referred to as the triple point where conveyor belt surface meets the rounder bar seal and also meets the rounder bar contour. This area tends to produce a circumferal blemish on the end of the dough portion that is pressed against this triple point.

With the instant invention, as seen in FIGS. 12-15, when a dough portion is placed or deposited onto the moving conveyor 205 the dough portion 201 will move towards or be presented to the rounder bar entry area 208 at the front of the rounder bar 202. As the dough portion 201 comes in contact with the larger rounder bar entry area 208 of the rounder bar 202 it will start to rotate and become entrained by and to the rounder bar contour 207. The differences are when one is rounding small dough portions 201 then the rounder bar 202 is rotated so that the opening of the rounder bar 202 to conveyor belt 205 is less open or of a smaller area. In these instances, whether more open or closed, the seal 209 and its sealing body element 209c are oriented so as to be efficient in scraping the dough from the conveyor with minimal or no leakage and minimal heat buildup. Additionally, with the automatic height adjuster 221, a constant pressure is automatically maintained regardless of changes in camber settings, operational variances (e.g. belt thickness, operational wear, etc), and the like. The instant invention allowing for accommodation of all height adjustments automatically.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A rounder apparatus comprising:
    an at least one conveyor having a conveyor surface;
    an at last one support frame;
    an at least one rounder bar height adjustment system;
    an at least rounder bar camber adjustment system;
    an at least one rounder bar coupled to the support frame by said at least one rounder bar height adjustment system above the conveyor at a set height and at a camber angle set by the at least one camber adjustment system;
    a rounder bar seal on the at least one rounder bar having a rounder bar seal channel and a rounder bar seal channel contour;
    a rounder bar seal mount contour body having,
        a first body member of at least three body members having at least a first contour;
        a second body member of the at least three body members extending down at an angle from the first body member; and
        a third body member of the at least three body members extending from the first body member and extending in an opposed direction from the second body member wherein the rounder bar seal channel contour mates with at least in part the first body member of the at least three body members and with the first body portion of the at least three body portions being coupled and retained within the rounder bar seal channel and rotating freely therein, the second and third body members of the at least three body members extending from the first body member of the at least three body members and each contacting the at least one conveyor surface and self aligning the seal with the at least one conveyor surface such that the rounder bar seal effectively forms a seal with the at least one conveyor surface.

2. The apparatus of claim 1, wherein the rounder bar seal mount contour body first contour is overall an at least one of a semi-spherical, spherical, ovoid, spheroid, cylinder with spheroid ends or cylindrical contour.

3. The apparatus of claim 1, wherein the rounder bar height adjustment system applies a downward pressure to the seal mount contour body to engage the seal with the conveyor belt surface.

4. The apparatus of claim 3, wherein the rounder bar seal mount contour body with the first, second and third body members of the at least three body members balances the downward pressure on the rounder bar seal mount contour body by applying substantially equal pressures to the second member of the at least three members and oppositely facing third member of the at least three members.

5. The apparatus of claim 3, wherein the rounder bar seal mount contour body with the first, second and third body members of the at least three body members balances the downward pressure such that it cancels a cantilevering load imparted by the extension of the second body member with pressure exerted on third body member of the at least three members on the seal mount body member.

6. The apparatus of claim 3, wherein the rounder bar seal mount contour body with the first, second and third body members of the at least three body members creates the seal with the conveyor belt such that the rounder bar seal body member can rotate to maintain a consistent angle against the conveyor belt surface regardless of the height set by the at least one height adjustment system.

7. The apparatus of claim 6, wherein the rounder bar seal body member sits at the consistent angle or orientation to the conveyor belt regardless of the camber of the rounding bar through said rotation of the rounder bar seal body member.

8. The apparatus of claim 1, wherein the at least one rounder bar height adjustment system further comprises an automatic height actuator or self-adjusting pressure device that maintains downward pressure on the rounder bar and self adjusts height based on changes in camber and orientation of the sealing bar during setup and operation.

9. The apparatus of claim 8, wherein the at least one rounder bar camber adjustment system is coupled to the at least one rounder bar height adjustment system and further comprises a camber adjustment mount that is coupled to the at least one rounder bar through a camber adjustment mount pivot center, such that the camber of the at least one rounder bar is adjusted about the camber adjustment mount pivot center.

* * * * *